United States Patent
Kim et al.

(10) Patent No.: US 12,389,478 B2
(45) Date of Patent: Aug. 12, 2025

(54) DYNAMIC CONFIGURATION OF MULTI-LINK FUNCTION IN WIRELESS LAN SYSTEM

(71) Applicant: LG Electronics Inc., Seoul (KR)

(72) Inventors: Namyeong Kim, Seoul (KR); Jeongki Kim, Seoul (KR); Jinsoo Choi, Seoul (KR); Taewon Song, Seoul (KR); Insun Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 411 days.

(21) Appl. No.: 18/013,120

(22) PCT Filed: Jun. 29, 2021

(86) PCT No.: PCT/KR2021/008181
§ 371 (c)(1),
(2) Date: Dec. 27, 2022

(87) PCT Pub. No.: WO2022/005167
PCT Pub. Date: Jan. 6, 2022

(65) Prior Publication Data
US 2023/0254802 A1    Aug. 10, 2023

(30) Foreign Application Priority Data

Jun. 29, 2020 (KR) .................. 10-2020-0079548
Jul. 8, 2020 (KR) .................. 10-2020-0084211
(Continued)

(51) Int. Cl.
*H04W 8/22* (2009.01)
*H04W 48/08* (2009.01)
(Continued)

(52) U.S. Cl.
CPC ............. *H04W 76/15* (2018.02); *H04W 8/22* (2013.01); *H04W 48/08* (2013.01); *H04W 48/16* (2013.01);
(Continued)

(58) Field of Classification Search
CPC ..... H04W 8/22–245; H04W 24/02–10; H04W 28/02–26; H04W 48/02–20;
(Continued)

(56) References Cited

U.S. PATENT DOCUMENTS

2019/0335454 A1    10/2019    Huang et al.

OTHER PUBLICATIONS

Akhmetov et al., "Follow up of discussion on multi-link operation," IEEE 802.11-20/0106r4, Mar. 2020, 27 pages.
(Continued)

*Primary Examiner* — Timothy J Weidner
(74) *Attorney, Agent, or Firm* — Fish & Richardson P.C.

(57) ABSTRACT

In a wireless local area network (LAN) system, a transmission MLD may include a first station (STA) and a second STA, which operate in a first link and a second link, respectively. The transmission MLD may transmit, to a reception MLD, a connection request frame including capability information related to whether a restricted basic service set (BSS) mode is supported and information related to use of the restricted BSS mode. The information related to the use of the restricted BSS mode may include first information related to an STA (among STAs in the transmission MLD) which operating in the restricted BSS mode, in which monitoring for signal reception (by the STA operating in the restricted BSS from an STA not operating in the restricted BSS mode) is performed based on acquisition of information indicating reception of a signal. The transmission MLD may receive a connection response frame from the reception MLD.

15 Claims, 34 Drawing Sheets

(30) Foreign Application Priority Data

| Jul. 8, 2020 | (KR) | ......................... 10-2020-0084217 |
| Jul. 14, 2020 | (KR) | ......................... 10-2020-0087090 |
| Jul. 29, 2020 | (KR) | ......................... 10-2020-0094604 |
| Sep. 2, 2020 | (KR) | ......................... 10-2020-0111790 |

(51) Int. Cl.
*H04W 48/16* (2009.01)
*H04W 60/04* (2009.01)
*H04W 74/00* (2009.01)
*H04W 76/11* (2018.01)
*H04W 76/15* (2018.01)
*H04W 84/12* (2009.01)
*H04W 88/02* (2009.01)
*H04W 88/08* (2009.01)
*H04W 92/02* (2009.01)
*H04W 92/10* (2009.01)

(52) U.S. Cl.
CPC ......... H04W 60/04 (2013.01); H04W 74/002 (2013.01); H04W 76/11 (2018.02); *H04W 84/12* (2013.01); *H04W 88/02* (2013.01); *H04W 88/08* (2013.01); *H04W 92/02* (2013.01); *H04W 92/10* (2013.01)

(58) Field of Classification Search
CPC ......... H04W 60/005–06; H04W 74/002–0891; H04W 76/10–50; H04W 84/02–16; H04W 88/02–12; H04W 92/02–24; Y02D 30/70
See application file for complete search history.

(56) References Cited

OTHER PUBLICATIONS

Kim et al., "Power saving considering non-AP MLD without STR capability," IEEE 802.11-20/0037r0, Jan. 2020, 13 pages.
Naribole et al., "MLO Constraint Indication and Operating Mode," IEEE 802.11-20/0226r5, Mar. 2020, 28 pages.
Park et al., "Multi-Link Power Save—Link Bitmap," IEEE 802.11-20/0085r0, Jan. 2020, 9 pages.

| Multi-link STA ||||
|---|---|---|
| 5GHz | 6GHz ||
| STA 1 Link 1 | STA 2 Link 2 | STA 3 Link 3 |

DYNAMIC CONFIGURATION OF MULTI-LINK FUNCTION IN WIRELESS LAN SYSTEM

CROSS-REFERENCE TO RELATED APPLICATIONS

This application is the National Stage filing under 35 U.S.C. 371 of International Application No. PCT/KR2021/008181, filed on Jun. 29, 2021, which claims the benefit of Korean Patent Application No. 10-2020-0079548, filed on Jun. 29, 2020, Korean Patent Application No. 10-2020-0084211, filed on Jul. 8, 2020, Korean Patent Application No. 10-2020-0084217, filed on Jul. 8, 2020, Korean Patent Application No. 10-2020-0087090, filed on Jul. 14, 2020, Korean Patent Application No. 10-2020-0094604, filed on Jul. 29, 2020, and Korean Patent Application No. 10-2020-0111790, filed on Sep. 2, 2020, which are all hereby incorporated by reference herein in their entirety.

TECHNICAL FIELD

The present specification relates to a method for prescribing and configuring a function that a multi-link device (MLD) can use in a multi-link environment in a wireless local area network (WLAN) system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

According to various embodiments, a transmitting MLD in a wireless local area network (WLAN) system, the transmitting MLD may include a first station (STA) and a second STA, the first STA operates on a first link, and the second STA operates on a second link, the transmitting MLD may transmit an association request frame to a receiving MLD. The association request frame may include capability information related to whether a limited basic service set (BSS) mode is supported and information related to use of the constrained BSS mode. The information related to the use of the constrained BSS mode may include first information related to which STA operates in the constrained BSS mode among STAs included in the transmitting MLD. The constrained BSS mode may mean a mode in which the STA operating in the constrained BSS performs monitoring for signal reception based on obtaining information to receive a signal from an STA not operating in the constrained BSS mode. The transmitting MLD may receive an association response frame from the receiving MLD.

According to an example of the present specification, the MLD may operate some links among a plurality of links in a constrained BSS mode. Essential information can be shared by each link at the MLD level, when a link operating in the constrained BSS mode obtains information to receive data from a general link that does not operate in the constrained BSS mode (i.e., through signal exchange in the MLD), the MLD may perform signal reception monitoring, the MLD may receive a data signal. Therefore, a plurality of links can be efficiently operated in terms of power.

BRIEF DESCRIPTION OF THE DRAWINGS

FIG. 6 shows an example of the structure of a non-AP MLD.

DETAILED DESCRIPTION

Figure 1:
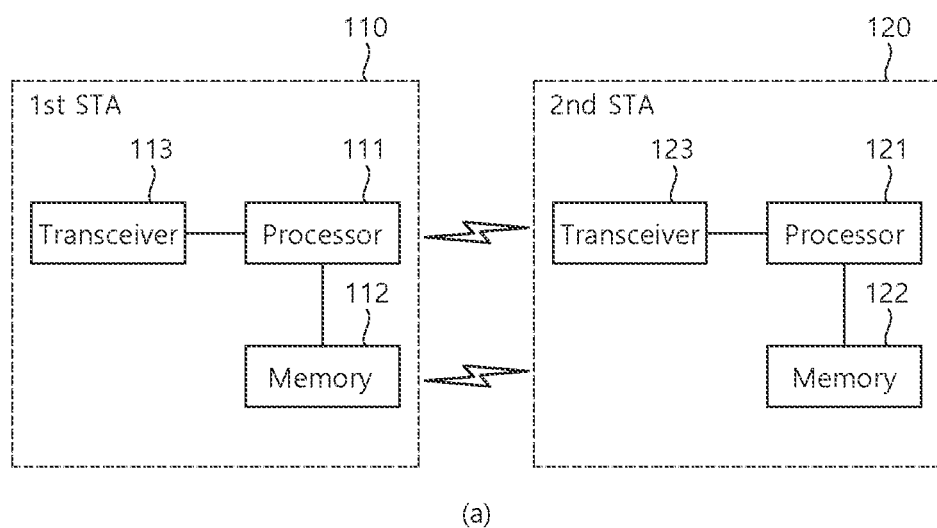
FIG. 1 shows an example of a transmitting apparatus and/or receiving apparatus of the present specification.
Figure 1:
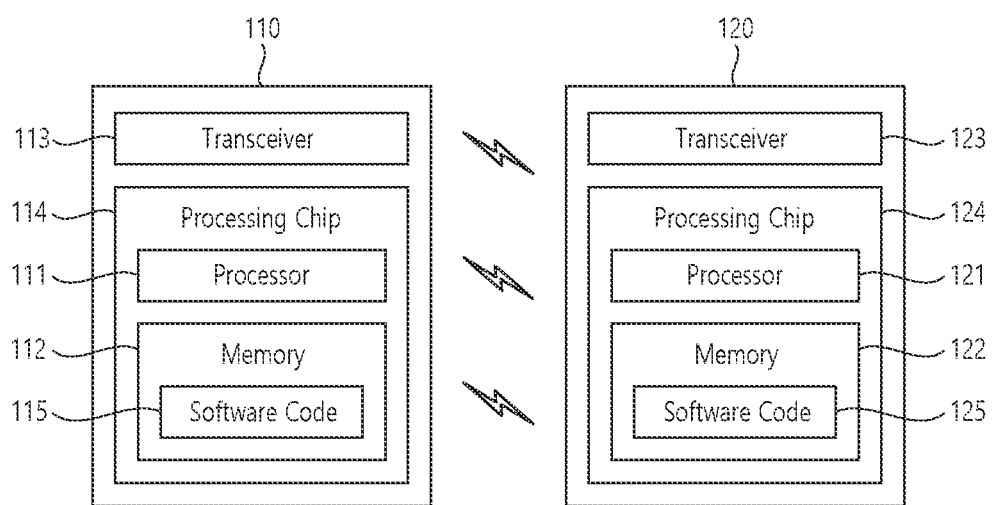

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
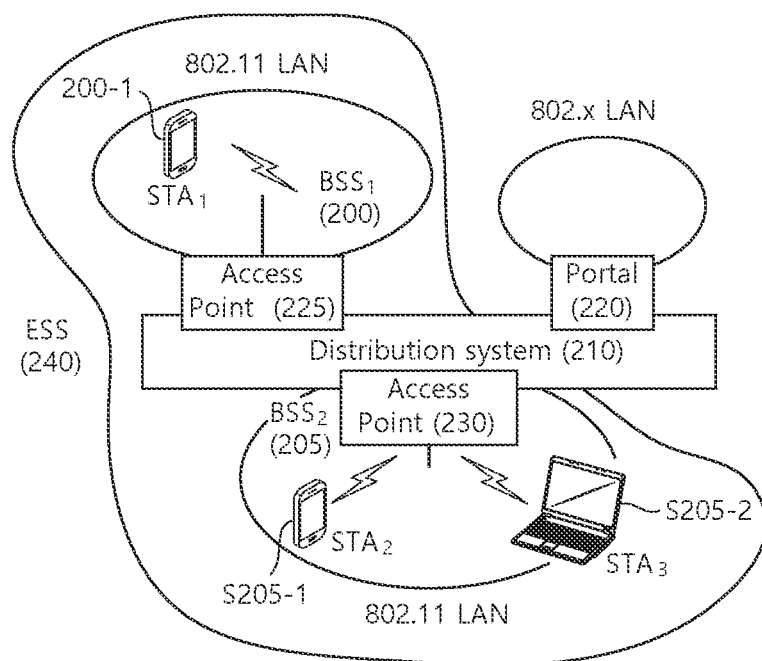
FIG. 2 is a conceptual view illustrating the structure of a wireless local area network (WLAN).
Figure 2:
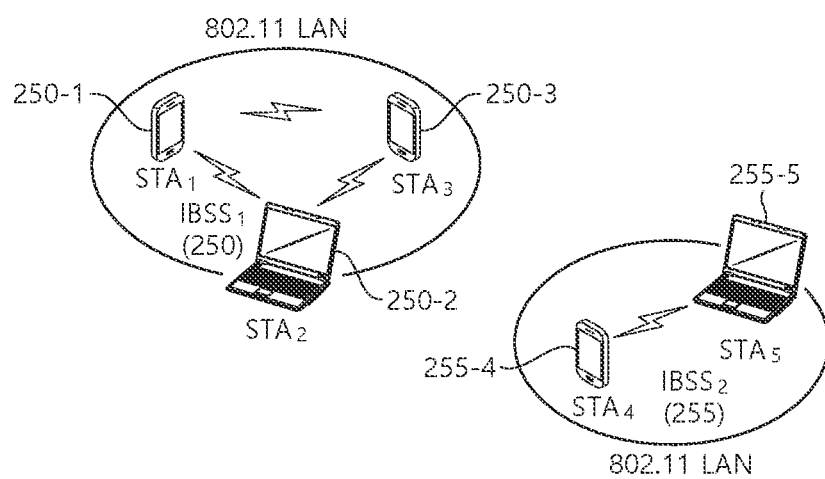

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
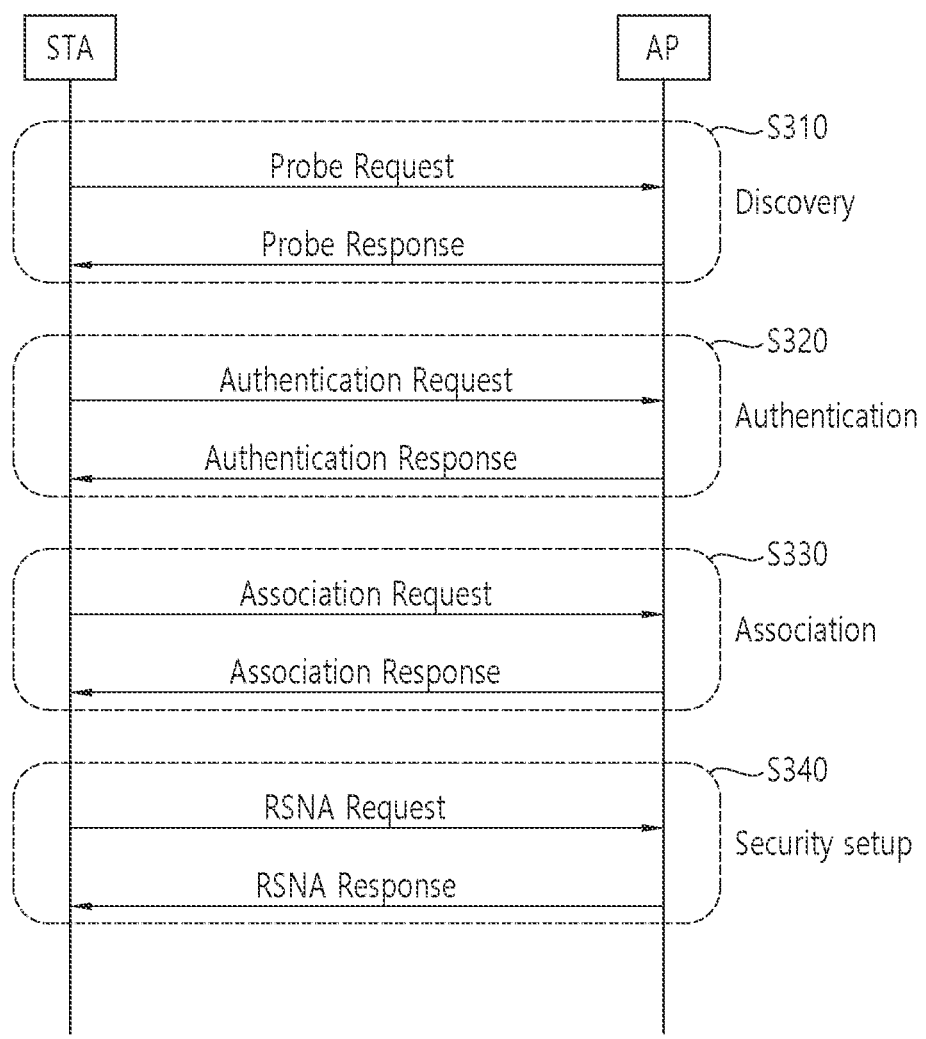
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/ response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Hereinafter, the PPDU transmitted/received by the STA of the present specification will be described.

Figure 4:
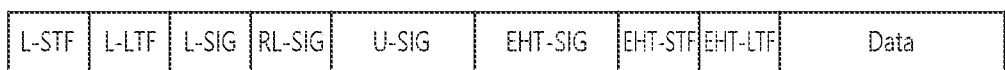
FIG. 4 illustrates an example of a PPDU used in the present specification.

FIG. 4 illustrates an example of a PPDU used in the present specification.

The PPDU of FIG. 4 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 4 may indicate the entirety or part of a PPDU type used in the EHT system. For example, the example of FIG. 4 may be used for both of a single-user (SU) mode and a multi-user (MU) mode. In other words, the PPDU of FIG. 4 may be a PPDU for one receiving STA or a plurality of receiving STAs. When the PPDU of FIG. 4 is used for a trigger-based (TB) mode, the EHT-SIG of FIG. 4 may be omitted. In other words, a STA which has received a trigger frame for uplink-MU (UL-MU) may transmit the PPDU in which the EHT-SIG is omitted in the example of FIG. 4.

In FIG. 4, an L-STF to an EHT-LTF may be called a preamble or a physical preamble, and may be generated/ transmitted/received/obtained/decoded in a physical layer.

A subcarrier spacing of the L-STF, L-LTF, L-SIG, RL-SIG, U-SIG, and EHT-SIG fields of FIG. 4 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 4, the L-LTE and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 4. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 µs. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/ RX/UL/DL) packet, a (TX/RX/UL/DL) data unit, (TX/RX/ UL/DL) data, or the like may be a signal transmitted/ received based on the PPDU of FIG. 4. The PPDU of FIG. 4 may be used to transmit/receive frames of various types. For example, the PPDU of FIG. 4 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 4 may be used for a management frame. An example of the management frame may include a beacon frame, a (re-)association request frame, a (re-)association response frame, a probe request frame, and a probe response frame. For example, the PPDU of FIG. 4 may be used for a data frame. For example, the PPDU of FIG. 4 may be used to simultaneously transmit at least two or more of the control frame, the management frame, and the data frame.

Figure 5:
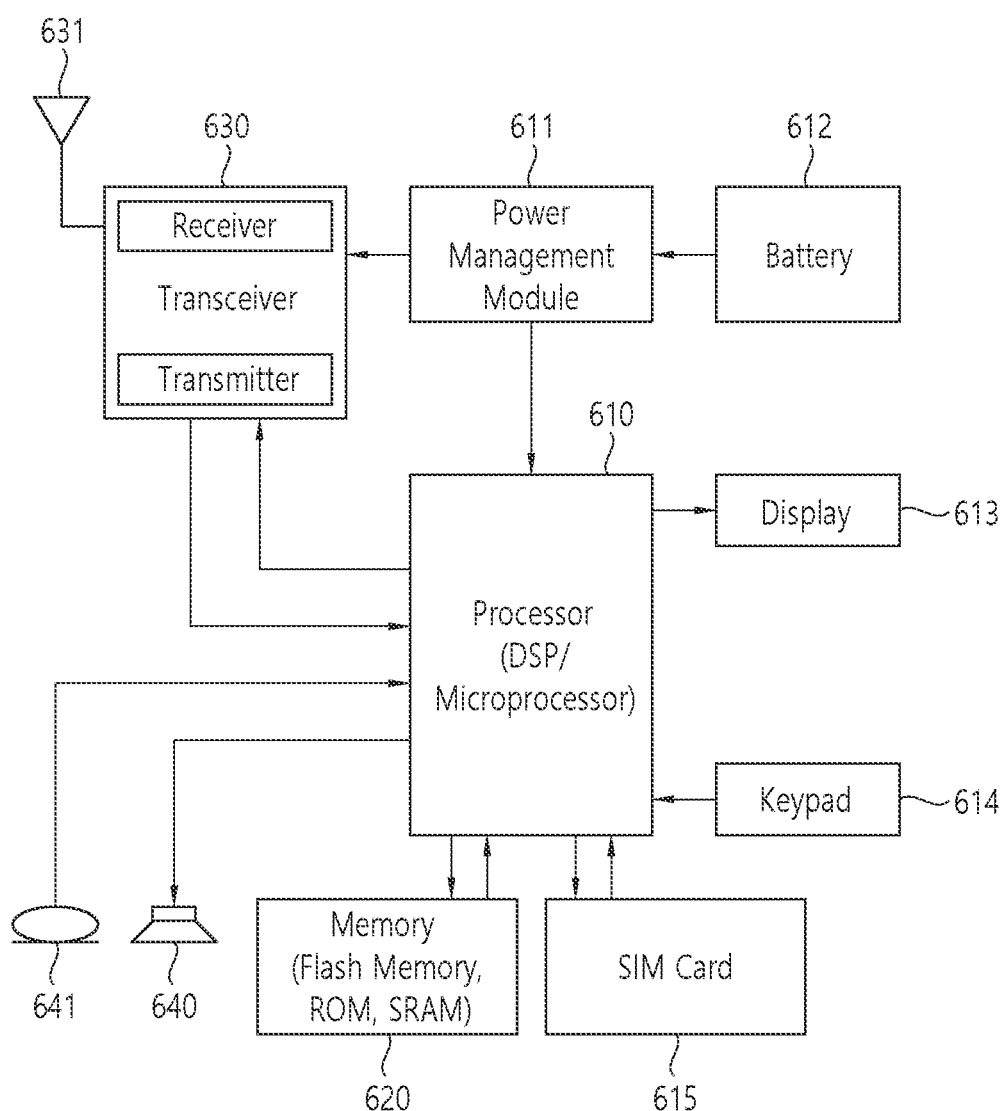
FIG. 5 illustrates an example of a modified transmission device and/or receiving device of the present specification.

FIG. 5 illustrates an example of a modified transmission device and/or receiving device of the present specification.

Each device/STA of the sub-figure (a)/(b) of FIG. 1 may be modified as shown in FIG. 5. A transceiver 630 of FIG. 5 may be identical to the transceivers 113 and 123 of FIG. 1. The transceiver 630 of FIG. 5 may include a receiver and a transmitter.

A processor 610 of FIG. 5 may be identical to the processors 111 and 121 of FIG. 1. Alternatively, the processor 610 of FIG. 5 may be identical to the processing chips 114 and 124 of FIG. 1.

A memory 620 of FIG. 5 may be identical to the memories 112 and 122 of FIG. 1. Alternatively, the memory 620 of FIG. 5 may be a separate external memory different from the memories 112 and 122 of FIG. 1.

Referring to FIG. 5, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 5, a speaker 640 may output a result related to a sound processed by the processor 610. A microphone 641 may receive an input related to a sound to be used by the processor 610.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown, the 5 GHz band, and the 6 GHz band (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC Voice (AC VO)) according to the conventional WLAN standard may be defined.

For example, it may be preset that all TIDs are mapped for uplink/downlink links. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

According to an embodiment, the MLD may include an non-AP MLD and an AP-MLD.

The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

In the following specification, MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto.

As described above, the at least one STA may transmit/receive a signal independently regardless of the MLD.

According to an embodiment, an AP MLD or a non-AP MLD may be configured in a structure having a plurality of links. In other words, the non-AP MLD may support a plurality of links. The non-AP MLD may include a plurality of STAs. A plurality of STAs may have a link for each STA.

The 802.11be standard (hereinafter, the EHT standard) may support a multi-link. Here, the multi-link may include multiple bands. That is, the multi-link may mean links included in several frequency bands, or may mean a plurality of links included in one frequency band.

The EHT standard may support Simultaneous TX/RX (STR) Channel access according to Link capability in a multi-link support environment. A device supporting a multi-link may be defined as a Non-AP/AP Multi-Link Device (MLD). STR Capability may mean that data (or signals) can be transmitted/received simultaneously in multiple links. That is, an MLD supporting STR capability (hereinafter, STR MLD) may receive data through one link when data transmission occurs on another link.

On the other hand, MLDs that do not support STR capability (hereinafter, non-STR MLDs) cannot simultaneously transmit and receive data (or signals) because data collision may occur due to interference. For example, when a non-STR MLD receives data (or a signal) from one link, it does not attempt transmission to another link to avoid interference. If data (or signal) transmission and reception occur simultaneously in both links, data (or signal) collision may occur.

In other words, the STR MLD may simultaneously perform signal transmission and signal reception in a multi-link, respectively. Non-STR MLD cannot simultaneously transmit and receive signals in a multi-link. While transmitting a signal in the first link among a multi-link, an STA that does not support the STR operation cannot receive a signal in a link different from the first link, but could transmit a signal. In addition, while receiving a signal in the first link among the multi-link, an STA that does not support the STR operation cannot transmit a signal in a link different from the first link, but could receive a signal.

FIG. 6 shows an example of the structure of a non-AP MLD.

Referring to FIG. 6, the non-AP MLD may have a structure having a plurality of links. In other words, the non-AP MLD may support a plurality of links. The non-AP MLD may include a plurality of STAs. A plurality of STAs may have a link for each STA. FIG. 6 shows an example of a structure of a non-AP MLD, but the structure of an AP MLD may be configured the same as an example of a structure of a non-AP MLD shown in FIG. 6.

For example, the non-AP MLD may include STA 1, STA 2, and STA 3. STA 1 may operate on link 1. Link 1 may be included in the 5 GHz band. STA 2 may operate on link 2. Link 2 may be included in the 6 GHz band. STA 3 may operate in link 3. Link 3 may be included in the 5 GHz band. The bands including link 1/2/3 may be an example, and they may be included in 2.4, 5, and 6 GHz.

As such, in the case of an AP/non-AP MLD supporting multi-link, each AP of the AP MLD and each STA of the non-AP MLD may be connected to each link through a link setup process. And at this time, the connected link may be changed or reconnected to another link by an AP MLD or a non-AP MLD depending on the situation.

According to an embodiment, each link between the AP MLD and the non-AP MLD may be determined in an Association or (re)Association process. At this time, the AP MLD and the non-AP MLD can perform frame exchange through the connected link. A specific embodiment in which the AP MLD and the non-AP MLD are connected through the link setup process may be described with reference to FIG. 7.

Figure 7:
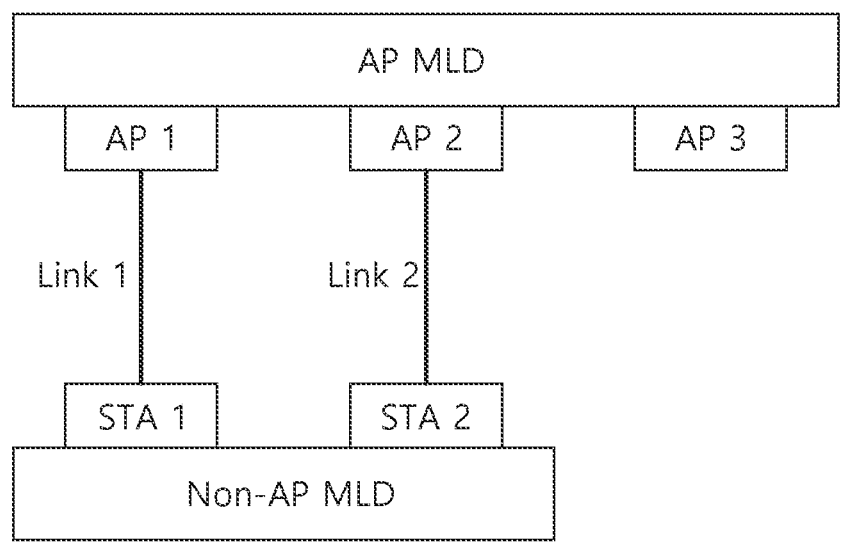
FIG. 7 illustrates an example in which an AP MLD and a non-AP MLD are connected through a link setup process.

FIG. 7 illustrates an example in which an AP MLD and a non-AP MLD are connected through a link setup process.

Referring to FIG. 7, the AP MLD may include AP 1, AP 2, and AP 3. The non-AP MLD may include STA 1 and STA 2. AP 1 and STA 1 may be connected through link 1. AP 2 and STA 2 may be connected through link 2.

For example, AP 1 and STA 1 may be connected through link 1 through a first link setup process. AP 2 and STA 2 may be connected through link 2 through a second link setup process. As another example, an AP MLD and a non-AP MLD may be connected through one link setup process. In other words, an AP MLD and a non-AP MLD may be connected through link 1 and link 2 based on one link setup process.

As described above, each AP and STA may perform frame exchange through a connected link. In addition, information on other APs on a different link or other STAs on a different link may be transmitted/received through one link.

However, after this link setup process, the AP MLD or non-AP MLD may request a link change or reconnection for more efficient frame exchange (for example, load balancing or interference avoiding, and the like) depending on the situation/environment.

An embodiment related to link change or reconnection may be described with reference to FIG. 8.

Figure 8:
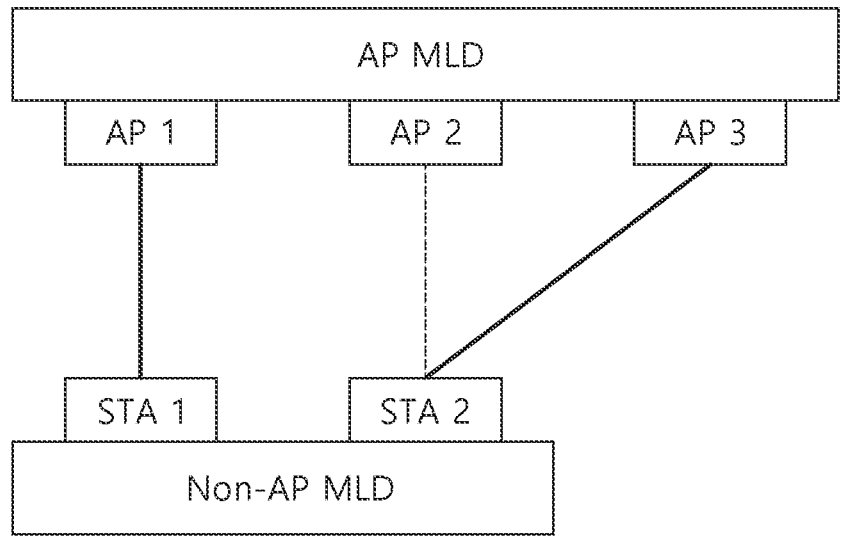
FIG. 8 shows an example in which a link is changed or reconnected.

FIG. 8 shows an example in which a link is changed or reconnected.

Referring to FIG. 8, STA 2 is previously connected to AP 2. Thereafter, the data load of AP 2 may be excessively generated. STA 2 may be reconnected to AP 3 having a relatively small data load. In this case, there is an effect that the AP MLD and the non-AP MLD can perform efficient data exchange.

Figure 9:
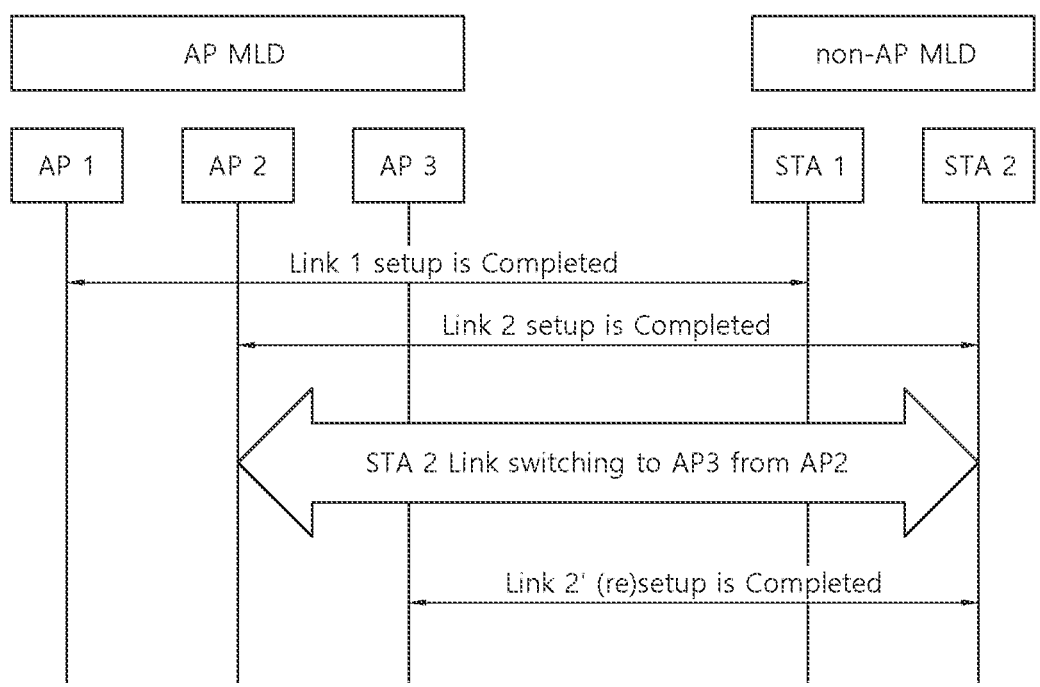
FIG. 9 shows a specific example in which a link is changed or reconnected.

FIG. 9 shows a specific example in which a link is changed or reconnected.

Referring to FIG. 9, AP 1 of the AP MLD may be connected to STA 1 of the non-AP MLD through link 1. AP 2 of the AP MLD may be connected to STA 2 of the non-AP MLD through link 2. Thereafter, STA 2 may attempt/request a connection with AP 3 through link change or reconnection, STA 2 may be connected to AP 3 through link 2 based on the link change or reconnection. That is, when agreed upon through Link switching negotiation, the STA may perform a link re-setup procedure in which the existing link is reconnected by changing the existing link from AP 2 to AP 3.

For example, a non-AP MLD and an AP MLD may request link transition to improve performance. At this time, the AP MLD and the non-AP MLD may select a more suitable link based on various information (e.g., data traffic load for each link, channel access capability between links, link state (disable/enable), etc.) for each current link or provide the aforementioned information to help the selection.

According to an embodiment, the AP MLD and the non-AP MLD may transmit/receive/exchange various types of information and link state information for each current link. Accordingly, the AP MLD and the non-AP MLD may select a link more suitable for transmitting and receiving signals based on various information and link states for each current link. For example, various types of information for each current link may include information about data traffic load for each link and channel access capability between links. For example, the link state may be set to disable or enable. In the link switching negotiation process, the non-AP MLD (or the AP MLD) may request that a specific STA change to another link, in response to this request, the AP MLD (or the non-AP MLD) may respond with a request acceptance or rejection message.

In the specification below, the process of changing an AP MLD/non-AP MLD to a link other than the one connected to improve performance or the process of negotiating with a non-AP MLD/AP MLD to request reconnection may be named as "Link switching negotiation". The name of the "Link switching negotiation" may be called variously, and may be changed.

Hereinafter, the link change or reconnection process may be divided into a case requested by the AP MLD and a case requested by the non-AP MLD.

An Embodiment in which AP MLD Requests Link Changing or Reconnection

According to an embodiment, the AP MLD may request a link change or reconnection to the non-AP MLD for efficient data transmission. For example, for load balancing, based on the data traffic of each AP, the AP MLD may request the STA to change or reconnect to a more efficient link.

For example, the AP MLD may calculate/verify/determine a link suitable for STAs of the non-AP MLD based on data traffic load information for each AP and/or channel access capability information between each link (for example, information about STR (Simultaneous TX/RX) capability, etc.). Thereafter, the AP MLD may request a link change or reconnection to the STA (or non-AP MLD), based on data traffic load information for each AP and/or channel access capability information between each link.

As described above, when requesting a link change, the AP MLD may transmit link information that it considers most appropriate to the non-AP MLD through a request message. For example, the request message may include a beacon or a management frame.

In relation to the above-described embodiment, an element or field including information on a link considered to be most suitable may be newly proposed. A newly proposed element or field may be defined as a "recommended link". The "recommended link" is an example, and the name of a specific element or field may be changed.

recommend link (element/field): An element or field for the AP MLD to recommend the most suitable link to the STA of the non-AP MLD based on various information for each link (for example, data load for each link, etc.). For example, the recommend link (element/field) may be indicated by Link ID information of AP MLD or AP BSS information. In other words, the recommend link (element/field) may include Link ID information of AP MLD or AP BSS information.

According to an embodiment, the recommend Link (element/field) may be optionally included in a Link-switching response and transmitted. For example, the STA may establish a connection with a link recommended by the AP based on the element/field (that is, recommend Link). For another example, the STA may perform a connection request to a link different from the indicated link based on the element/field (that is, recommend Link) and additional information it has.

A detailed signal exchange procedure between an AP MLD and a non-AP MLD according to the above-described embodiment may be described with reference to FIG. 10.

Figure 10:
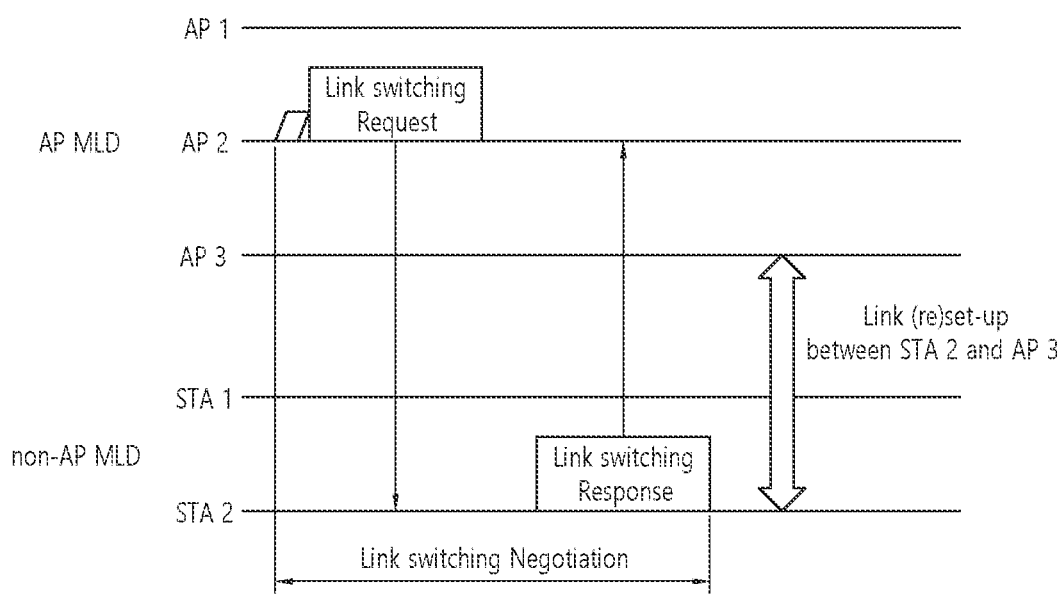
FIG. 10 illustrates the operations of an AP MLD and a non-AP MLD for link change or reconnection.

FIG. 10 illustrates the operations of an AP MLD and a non-AP MLD for link change or reconnection.

Referring to FIG. 10, in a situation in which STA 2 is connected to AP 2 through link 2, a lot of data traffic may be concentrated in AP 2. In other words, when STA 2 is connected to AP 2 through the link 2, a lot of data traffic may be generated in AP 2.

The AP MLD (or AP 2) may request the non-AP MLD (or STA 2) to reconnect to AP 3, which has relatively few STA connections. In general, the message for requesting reconnection is transmitted to the STA (that is, STA 2) that wants to reconnect, but depending on the situation (for example, channel status or link status), it may be transmitted to any STA (that is, another STA). In other words, based on the channel condition or link condition, the STA to which a request message for requesting reconnection (for example, Link-switching request frame) is transmitted may be changed.

For example, when the STA (that is, STA 2) that has received the request message for requesting the reconnection accepts the request, a response message with "Accept" (for example, Link-switching response frame) may be transmitted. For another example, when the STA (that is, STA 2) rejects this request, a response message with "Decline" may be transmitted.

In general, the STA that accepts the reconnection (that is, STA 2) may transmit a response message to the existing Link (the link before reconnection), but the response message may be transmitted through any link (that is, another STA) using the multi-link characteristic.

If STA 2 accepts the link reconnection request, after transmitting the response message, STA 2 may disconnect from the existing AP 2 and request link reconnection to AP 3. In this case, the reconnection request process may be performed in the same way as the existing link setup process between MLDs. After the link setup process between AP 3 and STA 2 is completed, STA 2 may perform frame exchange with AP 3 through Link 2.

Conversely, when STA 2 rejects the link reconnection request, STA 2 and AP 2 may use the existing linked link (that is, link 2) as it is.

According to an embodiment, when the AP requests a link change to the STA and a suitable link is recommended, the STA may or may not change the link to the recommended link. For example, the above-described recommend link may be used for the AP to recommend a link suitable for the STA.

For example, the STA may approve the link change as a response message to the request message for requesting reconnection of the AP. The STA may approve/confirm the link change with the recommended link, or may request another link change from the AP based on information other than the information included in the request message.

Accordingly, the AP needs to inform the STA of whether to accept the response message. To this end, the AP may transmit a confirmation message (for example, link switching confirmation frame) for the STA's response message (for example, Link-switching response frame) to the STA.

Specific operations of the AP MLD and the non-AP MLD of the above-described embodiment may be described with reference to FIG. 11.

Figure 11:
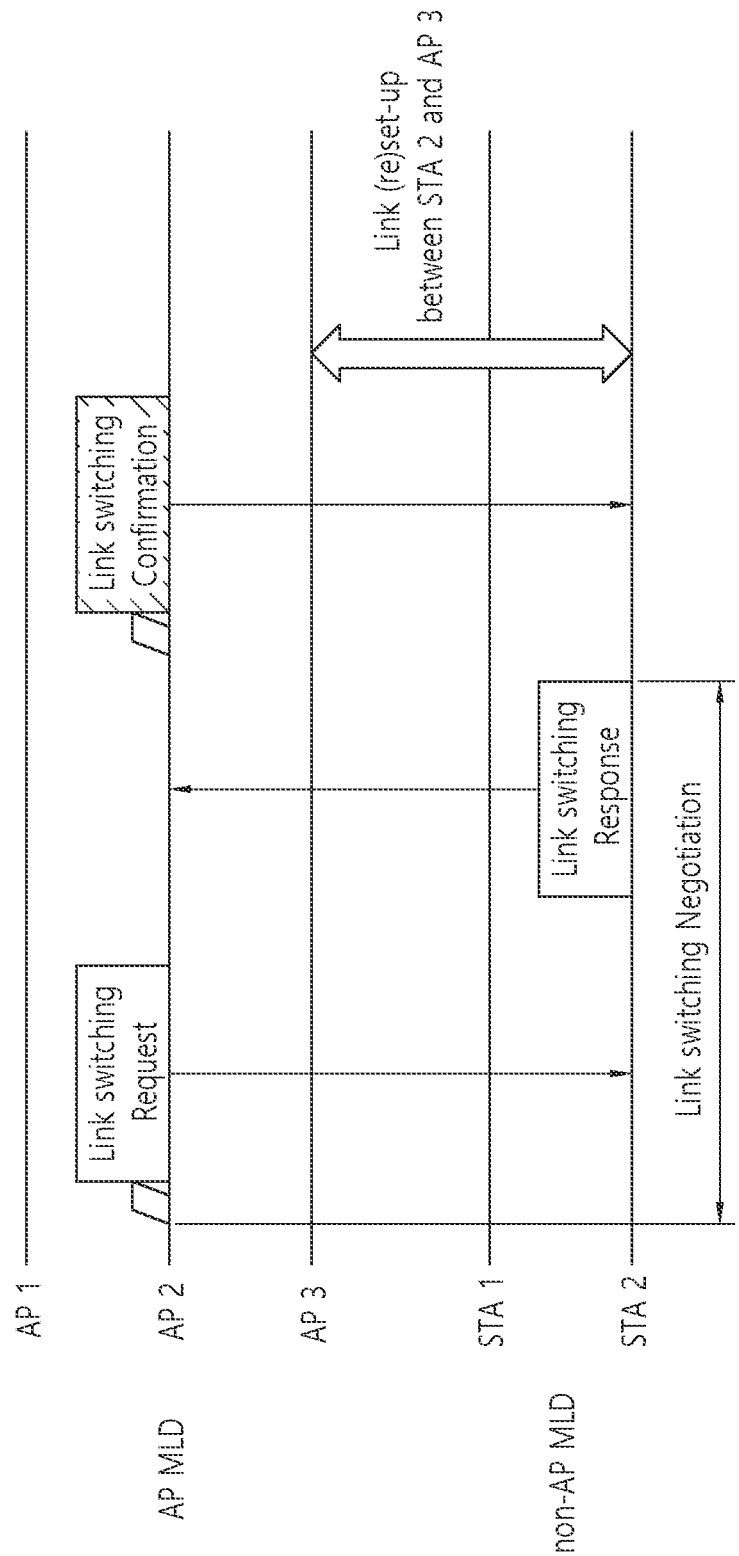
FIG. 11 illustrates the operations of an AP MLD and a non-AP MLD for link change or reconnection.

FIG. 11 illustrates the operations of an AP MLD and a non-AP MLD for link change or reconnection.

Referring to FIG. 11, AP 2 may request a link change to STA 2 by including the recommended link information. In other words, AP 2 may transmit a link-switching request frame including the recommended link information to STA 2.

STA 2 may transmit whether to accept the link request through a Link-switching response frame.

For example, when link switching is accepted, STA 2 may transmit link information to be changed via a link-switching response frame. At this time, the link information to be changed may or may not be the same as the recommended link.

For another example, when STA 2 selects a link other than the recommended link provided by AP 2 and responds with a link-switching response frame, the AP may transmit a message indicating whether to finally approve the link to the STA. The message may be referred to as a link switching confirmation frame.

For example, AP 2 may accept the link change to the link designated by STA 2 through the Link Switching Confirmation frame. STA 2 may attempt to change a link to a link designated by it, based on the Link Switching Confirmation frame.

As another example, AP 2 may refuse to change the link to the link designated by STA 2 through the Link Switching Confirmation frame. STA 2 and AP 2 may maintain the connection with the previously connected link without changing the link.

An Embodiment in which a Non-AP MLD Requests Link Change or Reconnection

According to an embodiment, the non-AP MLD may request link change or reconnection to the AP MLD for efficient data transmission. For example, in order to use the STR capability during data transmission, the non-AP MLD may request connection link change or reconnection from the AP MLD.

Figure 12:
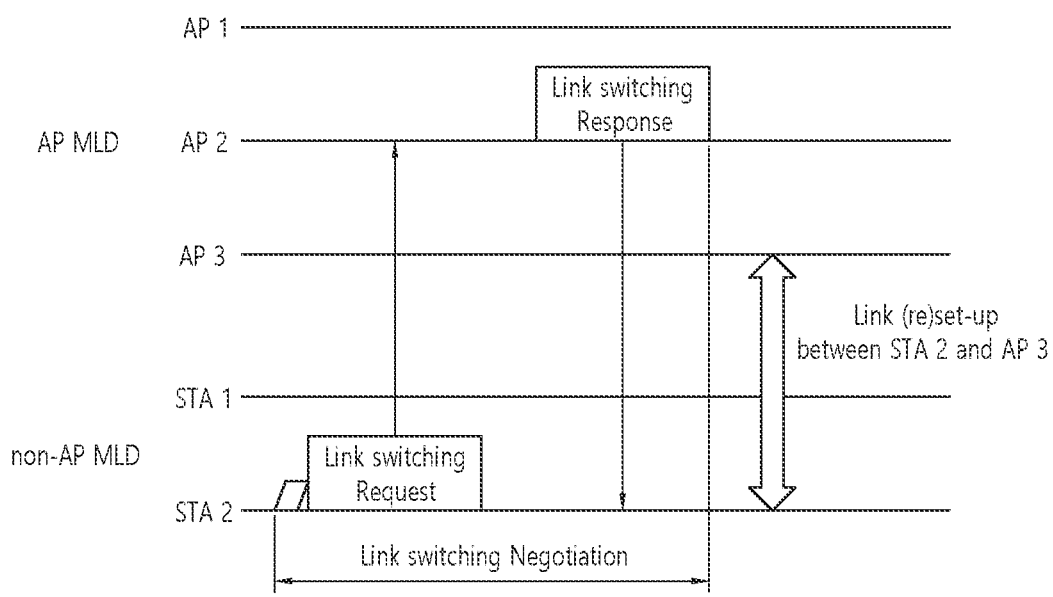
FIG. 12 shows the operations of an AP MLD and a non-AP MLD for link change or reconnection.

FIG. 12 shows the operations of an AP MLD and a non-AP MLD for link change or reconnection.

Referring to FIG. 12, an AP MLD and a non-AP MLD may perform link switching negotiation. STA 2 of the non-AP MLD may transmit a link switching request frame to AP 2 of the AP MLD. AP 2 of the AP MLD may transmit a link switching response frame to STA 2 of the non-AP MLD in response to the link switching request frame. The link switching request frame or link switching response frame may be transmitted and received through a link to be changed, but is not limited thereto. The link switching request frame or the link switching response frame may be transmitted and received through various links as well as a link to be changed.

For example, as shown in FIG. 12, when an STA of a non-AP MLD determines that direct link change is necessary (for example, when an existing linked link is busy for a long time or when an STA of a non-AP MLD wants to acquire QoS for data transmission, etc.), the STA may directly reselect an appropriate link and request a link change from the AP MLD. Upon receiving the link change request message, the AP MLD may transmit an "Accept" response message if it accepts the request, and the AP MLD may transmit a "Decline" response message if it rejects the request. At this time, STA 2 may transmit Link switching request message including STA information to change Link (e.g., STA ID, etc.) and Link information to change (e.g., Link ID or AP BSS information, etc.).

If the AP accepts the link change request, upon receiving the accept response message, the STA may perform a link re-setup process to reconnect to the reselected AP. If the AP rejects the link change request, the STA may use the existing linked link as it is.

In addition, in 11be, supporting the anchor link (however, the anchor link name may be newly defined with a different name in later specifications) function for power saving of non-AP MLD is being considered. Anchor link is a concept that divides multi-link of MLD into anchor/non-anchor link. Non-AP MLD may manage one or more links among several links connected to the AP MLD by designating the one or more links as an anchor link. The anchor link is a link that performs basic BSS operation, beacon monitoring, management frame management, group addressed frames prediction, and keep-alive functionality. Anchor link can be used as a default link for management signaling. Non-anchor links, other than anchor links, perform only constrained BSS operations, and may operate in doze state if there is no explicit instruction. Therefore, since an STA operating on a non-anchor link can maintain a doze state unless otherwise instructed, more power can be saved compared to an STA operating on an anchor link. That is, the overall power consumption of the non-AP MLD can be reduced by performing the basic BSS operation function only on a specific link configured as an anchor link and entering doze on other links.

The STA of the non-AP MLD performing the anchor link function must always maintain the enable state to receive the management frame (e.g., beacon frame), the STA of non-AP MLD must be awake based on TBTT (Target Beacon Transmission Time) to receive Beacon frames even when Power save mode is supported. On the other hand, in the case of a non-anchor link, if there is no explicit instruction, the STA of the non-AP MLD does not need to be awake based on TBTT to receive Beacon. Therefore, the operation to perform the anchor link function requires a relatively large load and power consumption compared to non-anchor links. On the other hand, in the case of a non-anchor link in which data frame exchange does not occur, power consumption can be reduced because it can enter a doze state (or an unavailable state in the case of an active mode).

Figure 13:
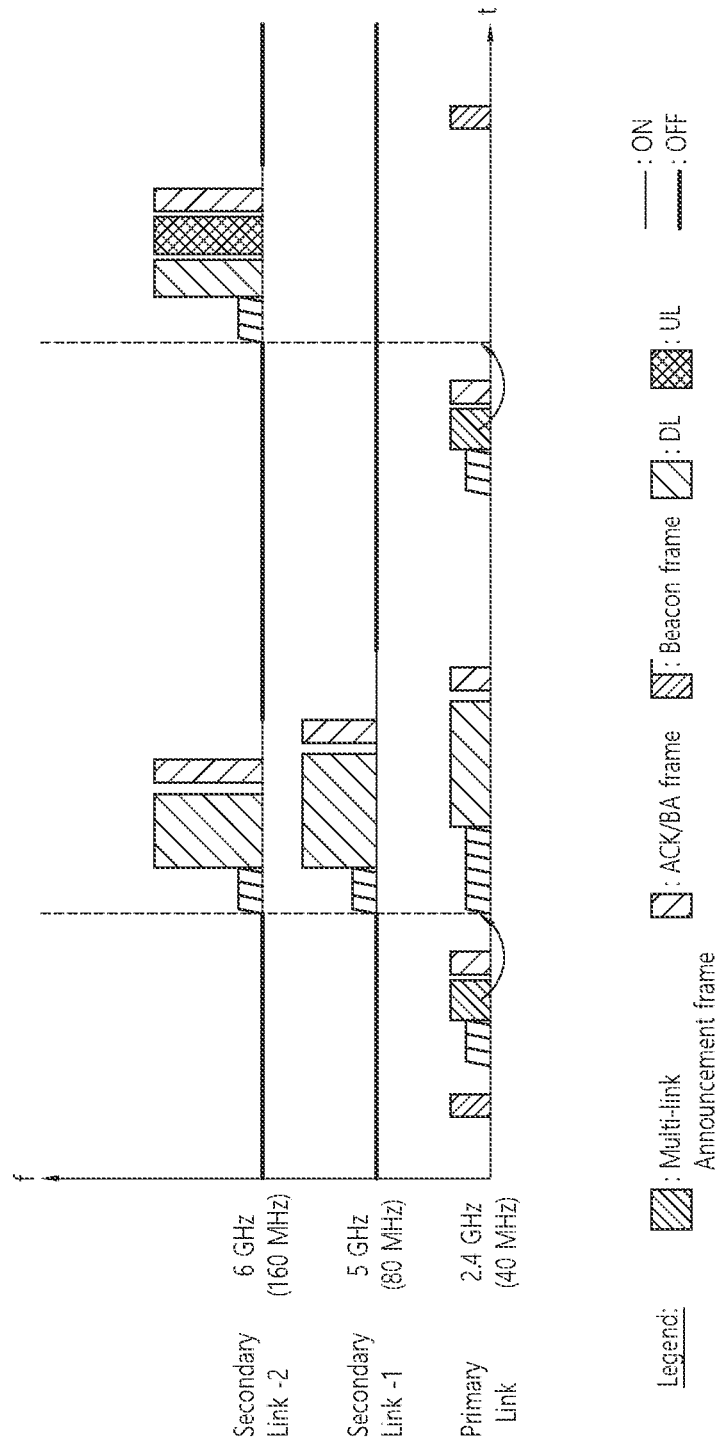
FIG. 13 is a diagram illustrating an embodiment of an operation of a non-AP MLD supporting an anchor link function.

FIG. 13 is a diagram illustrating an embodiment of an operation of a non-AP MLD supporting an anchor link function.

Referring to FIG. 13, a primary link may mean an anchor link, and a secondary link may mean a non-anchor link. The MLD may transmit and receive a beacon frame, a multi-link announcement frame, etc. on an anchor link (i.e., a primary link), the MLD may perform only DL reception, UL transmission, and ACK transmission and reception on anon-anchor link (i.e., secondary link).

In addition, in 11be, supporting primary link (However, the primary link name may be newly defined with a different name in later specifications. For example, anchor link) function to avoid data collision due to interference issues occurring during data transmission/reception when non-STR capability of MLD is supported, is being considered. The primary link function is a function to divide the multi-link of the MLD into primary/non-primary links and perform constrained CCA in the case of links configured as non-primary links, thereby preventing the non-STR AP MLD from transmitting/receiving data. Data collisions. The MLD may set some links as primary links and some remaining links as non-primary links. The primary link can perform independent CCA like a general link, but in the case of a non-primary link, independent CCA cannot be performed and the CCA operation function may be limited. Therefore, when the MLD transmits data, it must necessarily be transmitted through the primary link, and in this case, the non-primary link can be used only as a link for data aggregation without performing CCA.

When the STA transmits data by randomly performing CCA for each link, from the point of view of the non-STR AP MLD, it is impossible to know the data transmission timing of its own and the data timing received from other STAs (e.g. legacy device with single link). Therefore, by performing CCA on only a specific link, issues occurring on the non-STR AP MLD side can be resolved.

Therefore, when AP MLD uses the primary link function, the STA or the non-AP MLD checks which link operates as the primary link, and the STA connected to the link may perform a constrained CCA operation.

1. Definition of a Link that Operates as a Special Function

An AP MLD and a non-AP MLD may configure multiple links through a multi-link setup process. At this time, each STA of the non-AP MLD may perform a basic BSS operation for each link and exchange data based on a channel/link state.

As 11be supports multi-link, it does not need to perform the same operation (e.g. Basic BSS operation) for all connected links, but attributes having different functions for each link based on special purposes are considered. For example, in the case of a non-AP MLD supporting the anchor link function, the anchor link performs Basic BSS operation like a basic link. However, in the case of other links (i.e. non-anchor links) of the same non-AP MLD other than the anchor link, power consumption can be reduced by performing only a constrained BSS operation.

In 11be, for links established through multi-link setup between MLDs, an AP MLD or a non-AP MLD may configure a special function (e.g., an anchor link of a non-AP MLD, a primary link of an AP MLD, etc.) for a link based on a special purpose.

In this specification, it is defined as follows to refer to the special function of these links.

Link function: A link function assigned to perform a special function for a specific purpose in the link where the STA and AP are connected. The functions of these links can be configured or released by the AP or STA for each link, this function refers to functions for performing an operation different from an operation performed by an existing general link (i.e., Basic BSS operation). For example, this may be the case where the non-AP MLD sets some links as anchor links or the case where the AP MLD sets some links as primary links.

2. Proposal of Elements and Fields to Control Link Functions

If the "Link function" mentioned above can be configured/released for each link by the AP or STA, it may be more efficient for the AP MLD or the non-AP MLD.

Therefore, we propose an element or field for the AP MLD or non-AP MLD to efficiently control the "link function". The information defined below may be defined as an element or may be defined as a field or sub field within an existing element.

Support link function: Information on the link function list supported by the current AP MLD or non-AP MLD for "Link function" that each link can configure. A special link function can be configured for each link connected through multi-link configuration, and this information can include a list of functions that can be supported by the current AP MLD or the current non-AP MLD. Support link function information can be included in the management frame (e.g., Beacon or Probe request/Probe response, (re)Association request/(re)Association response, etc.), based on this list information, the AP MLD or the non-AP MLD can configure special link functions available for each link. This information may be included in the EHT MAC capability or EHT operation element. For example, when the "Support anchor link" subfield exists in the "Support link function" field among the information within the association frame exchanged between the AP MLD and the non-AP MLD during the multi-link setup process, it can be known that non-AP MLD and AP MLD support anchor link function.

Support anchor link: Information indicating that the MLD supports the anchor link function. This information may be defined as a subfield within the "Support link function" field defined in this specification, or may be included in the EHT MAC capability or EHT operation element as separate information.

Support primary link: Information indicating that the MLD supports the primary link function. This information may be defined as a subfield within the "Support link function" field defined in this specification, or may be included in the EHT MAC capability or EHT operation element as separate information.

Support constrained BSS operation mode: Information indicating that the MLD supports the constrained BSS mode proposed in this specification. This information may be defined as a subfield within the "Support link function" field defined in this specification, or may be included in the EHT MAC capability or EHT operation element as separate information.

Support constrained CCA operation mode: Information indicating that the MLD supports the constrained CCA mode proposed in this specification. This information may be defined as a subfield within the "Support link function" field defined in this specification, or may be included in the EHT MAC capability or EHT operation element as separate information.

Support enabled link mode: Information indicating that the MLD supports the Enabled link mode proposed in this specification. This information may be defined as a subfield within the "Support link function" field defined in this specification, or may be included in the EHT MAC capability or EHT operation element as separate information.

Constrained BSS operation mode (sub)field: A link configured for this mode (i.e., an STA set to "Constrained BSS operation mode"=1 through data exchange with an AP) performs only constrained BSS operations. As a method for reducing power consumption by using the characteristics of a non-AP MLD supporting multiple links, a link operating in Constrained BSS operation mode can basically maintain a doze state without performing beacon monitoring, unlike a general link. In a link operating in a constrained BSS operation mode, even if there is buffered data, the STA may awake and receive DL data only when a separate explicit instruction is given. For example, if TID-link-mapping is mapped to default mode (i.e., all TIDs) for all links in MLD, an AP MLD may transmit DL data to a non-AP MLD regardless of the link, but if a link is mapped to a specific TID, the AP MLD must transmit DL data only through a specific link of the non-AP MLD. Therefore, if TID-link-mapping is performed for each link for non-AP MLD, when the non-AP MLD is operating in a PS (power saving) mode, if some STAs enter the doze state, the AP MLD must awake the STA of the link mapped to a specific TID based on the TID of the DL data. If there is no separate explicit instruction, the link operating in the constrained BSS mode (i.e., the STA operating in the link), by maintaining the doze state without performing operations for beacon monitoring, management frame exchange, keep alive message exchange, etc. which are basically performed in a link, a STA connected to a corresponding link (i.e., a link operating in constrained BSS operation mode) can reduce power consumption. However, several frames (Beacon and management frames), etc., for STAs operating in Constrained BSS operation mode and having constraints can be replaced by transmitting to another link (i.e., anchor link) currently in the Awake state of the connected non-AP MLD. That is, an STA of a link not operating in the constrained BSS mode of the non-AP MLD may share information with an STA of a link operating in the constrained BSS mode. Constrained BSS operation mode indicated by this field may be the same as that of a non-anchor link. The STA of the Non-AP MLD can configure each link to operate as a non-anchor link by setting "Constrained BSS operation mode"=1 for each link, a link set to "Constrained BSS operation"=0 can operate as an anchor link that performs basic BSS operation in the same way as the existing general link. For example, when information (e.g., "Constrained BSS operation mode" field) for indicating a link function that performs a constrained BSS operation is piggy-backed and transmitted, it may be included in data or a QoS null frame, and may be included in a QoS Control field or EHT Control field (or EHT A-Control field) and transmitted. For example, 1 bit can be used to indicate whether or not a constrained BSS mode is set, and a value 1 can mean mode setting, and a value 0 can mean mode release. When requesting setting/release of the constrained BSS mode, "Link Identifier" information (e.g., Link ID or STA ID) is transmitted along with "Constrained BSS operation mode" setting information, so that the corresponding mode can be set/released for each link. The default value of the constrained BSS mode field is 0, and if there is no separate setting, the STA can perform basic BSS operation in the same way as the general link. For example, mode setting request information may be included in a separate management frame (e.g., probe request frame) and transmitted.

Constrained CCA operation mode (sub)field: A link set to this mode (i.e., an STA set to "Constrained CCA operation mode"=1 through data exchange with an AP) can perform a constrained CCA operation. As a method for solving interference issues that may occur due to non-STR capability caused by the characteristics of MLD supporting multiple links, a link operating in constrained CCA operation mode may perform constrained CCA for data transmission unlike a general link. In particular, the constrained CCA mode may be meaningful when the AP MLD supports non-STR capability. A link set in constrained CCA mode cannot perform independent CCA for data transmission, when it is determined that the channel is idle through the CCA of the general link of the same non-AP MLD (i.e., a link not set to constrained CCA mode), if data aggregation is desired, data can be transmitted using a link configured in constrained CCA mode. In other words, a link set in constrained CCA mode cannot be used as an independent link for data transmission/reception, it can be used only as a link additionally used when transmitting/receiving data through other general links. In 11be, a link that performs this restrictive CCA is referred to as a non-primary link, a link that performs general CCA is referred to as a primary link. However, the exact terms may change later. In order to avoid interference problems that may occur during data transmission/reception when the AP MLD is a non-STR capability, the AP MLD can avoid an inter-link interference problem by limiting CCA performance by using some links as non-primary links by considering a non-STR capability between links. Therefore, the Constrained CCA operation mode indicated by this (sub)field is the same as that of the non-Primary link. The AP of the AP MLD or the STA of the non-AP MLD sets "Constrained CCA operation mode"=1 for each link, the AP of the AP MLD or the STA of the non-AP MLD may configure the link to operate as a non-Primary link, a link set to "Constrained CCA operation"=0 operates as a primary link that performs basic CCA operation in the same way as the existing general link. For example, when information for indicating a link function performing a constrained CCA operation (e.g., Constrained CCA operation mode field) is piggy back and transmitted, it can be included in the data or a QoS null frame, and can be transmitted by setting the QoS Control field or EHT Control field (or EHT A-Control field). For example, 1 bit can be used to indicate whether or not a constrained CCA mode is set, and a value of 1 may mean mode setting, and a value of 0 may mean mode release. When requesting to set/release the corresponding mode, "Link Identifier" information (e.g., Link ID or STA ID) is transmitted together with "Constrained CCA operation mode" setting information, so that the corresponding mode can be set/unset for each link. The default value of the constrained CCA mode field is 0, and if there is no separate setting, the STA can perform a basic CCA operation identically to the general link. If the AP MLD sets this mode, the AP MLD may notify the non-AP MLD by including the corresponding change in a management frame (e.g., Beacon, Broadcast Probe response, etc.) whenever a corresponding bit value is changed.

Enabled link mode (sub)field: The link set to this mode means an Enabled Link, that is, a link in which the current EHT STA is connected to the AP and operates, and may also be called an Operating link. The enabled link means a link that can be used by an STA for frame exchange with an AP and is mapped with at least one TID. Due to the characteristics of MLD supporting multiple links, a non-AP MLD may use some of its links as enabled links or disabled links (that is, a link that is not used by the current EHT STA as an operating link, and refers to a link that is not mapped to a TID). That is, a link to which at least one TID is mapped may be an enabled link, and a link to which no TID is mapped may be a disabled link. The exact name of each link may be changed in the future. That is, using it as an enabled link means that the EHT STA uses it as its operating link. If the EHT STA of the EHT Non-AP MLD can dynamically enable or disable each link, the operating link of the non-AP MLD can be switched or changed based on circumstances. Therefore, the Enabled link mode operation indicated by this (sub) field is the same as the operation performed by the STA as an enabled link on the corresponding link. The STA of the non-AP MLD can configure the corresponding link to operate as an operating link (i.e., enabled link) by setting "Enabled link mode"=1 for each link. If the EHT STA previously used another link as an operating link, the link is disabled and the corresponding link is set as an enabled link. The mapping TID value of the newly configured Enabled link can be set as follows.

(1) In Case of Setting the Mapping TID Value Used in the Previous Link as it is:

When the STA uses a second link connected to another BSS as an enabled link before setting the first link as an enabled link, a method of setting the TID value mapped to the second link to the first link as it is.

For example, when STA 1 connects to AP 1 and uses Link 1 as an operating link, and then connects to AP 2 and uses a new Link 1' as an operating link, the mapping TID value set in Link 1 can be set as it is.

(2) When Setting a New Mapping TID Value:

A method of newly setting mapping TID information by transmitting TID-to-link mapping information together when the STA sets Enabled link mode to 1 and uses the corresponding link as an Enabled link.

For example, if STA 1 sets Enable link mode=1 for Link 1 and wants to use it as an operating link, when STA 1 requests mode setting, STA 1 may transmit mapping TID information together to perform link activation and TID configuration at the same time.

(3) In Case of Restoring the Mapping TID Value Used Before the Link was Disabled:

If the STA has previously used the corresponding link as an enabled link, a method of storing the mapping TID information at that time and then restoring and using it as it is.

For example, when STA 1 uses Link 1 as an Enabled link and then disables it, when setting it again as an Enabled link, STA 1 stored the previous mapping TID information and restore and set as is.

(4) When Setting the Default Value:

A method of setting a default TID value (e.g., mapping TID 0-7) to be mapped when the STA configures the corresponding link as an Enabled link.

The mapping TID value applied when setting or changing Enabled link may be statically defined by implementation among the above methods, or a separate method for the STA to dynamically set or change the mapping TID setting method may be defined. Also, when defining such a new method, a separate new field needs to be defined. For example, a total of four methods may be defined as above for the TID mapping method, and the EHT STA may select or change a method of setting the mapping TID for the conversion link when the link is switched. For example, the mapping TID value setting method may be defined by each bit of the bitmap, and the EHT STA may indicate the method that the EHT STA desired by setting bit 1. A TID mapping setting method for such a switched link may be defined in detail later.

In this way, information indicating to set as an enabled link ("Enabled link" field), for example, may be included in data or a QoS null frame when transmitted by piggy backing, and the information may be transmitted by setting a QoS Control field or an EHT Control field (or A-Control field).

For example, 1 bit can be used to indicate whether or not this mode is set, and a value of 1 means mode setting (i.e., setting the corresponding link as an Enabled link), a value of 0 means mode release (i.e., setting the corresponding link as a Disabled link). At this time, when requesting to set/release the corresponding mode, "Link identifier" information (e.g., Link ID or STA ID) may also be transmitted together with "Enabled link" setting information, such that the corresponding mode can also be set/released for links of other STAs. Alternatively, mode setting request information may be included in a separate management frame (e.g., a probe request frame) and transmitted. In addition, when using this mode, an environment is assumed that the non-AP MLD performs link setup for all or some APs in the AP MLD and initial multi-link process, after that, the STA can switch the link to another BSS without an additional link reconfiguration process (e.g., association). In other words, in this mode, an environment is assumed that the EHT STA performs link setup for an AP entity that is not used as its operating link, there is an AP entity (i.e., BSS) that can transmit a request message without separate link resetting after multi-link setup. However, if the EHT STA transmits the link indicator information together with the "Enabled link mode" setting request information, the assumption is not necessary. However, this case implies a situation in which the STA transmits to a link other than the link to be configured as the operating link.

3. Proposal of a Method for Dynamically Controlling the Function of a Link

In the present specification, when an AP MLD and a non-AP MLD are connected for multi-link, a method for notifying a special link function supported by the MLD is proposed.

In Section 2, "Support link function" field was proposed to inform information on the list of special link functions supported by each MLD. This information is list information of link functions that AP MLD and non-AP MLD can support, based on this information, the AP of the AP MLD or the STA of the non-AP MLD can know the link functions available to itself. This information may be included in EHT capability or EHT operation element, this information may be exchanged during the initial multi-link setup process or provided as optional information after multi-link setup.

Figure 14:
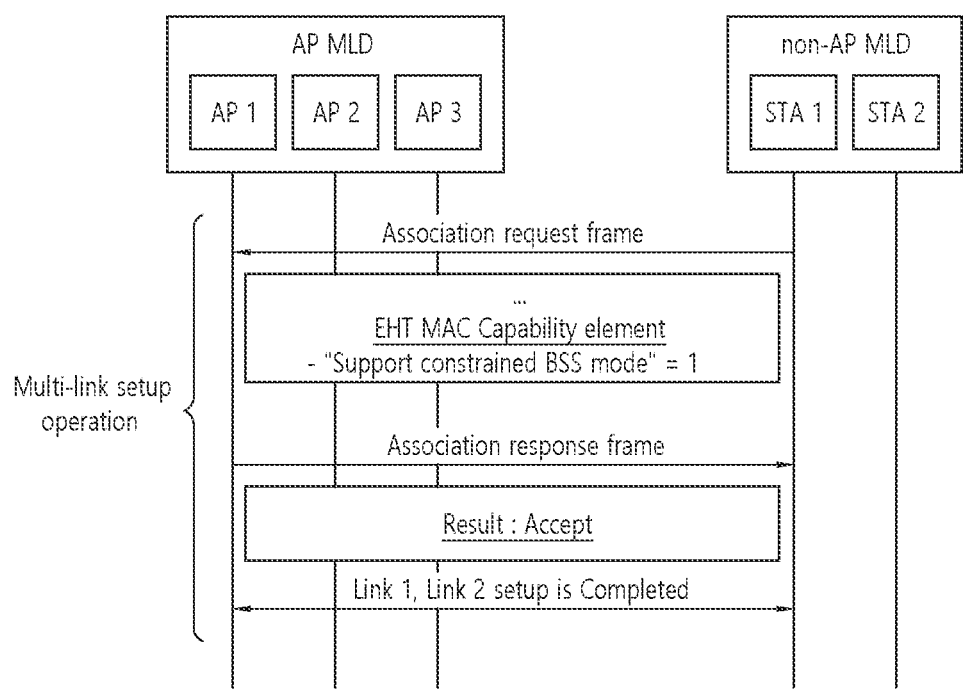
FIG. 14 is a diagram illustrating an embodiment of a process of exchanging information on whether Constrained BSS mode is supported or not.

FIG. 14 is a diagram illustrating an embodiment of a process of exchanging information on whether Constrained BSS mode is supported or not.

Referring to FIG. 14, the AP MLD may include AP1, AP2, and AP3, and the non-AP MLD may include STA1 and STA2. When defining capability (e.g., Support Constrained BSS mode) for the Constrained BSS mode function in 11be, during the multi-link setup process, constrained BSS mode capability information can be included in the EHT capability element in the association frame, constrained BSS mode capability information may be exchanged through capability negotiation. Through capability information exchange, it can be checked that AP MLD and non-AP MLD can use constrained BSS mode functions.

The AP MLD may transmit an association request frame. The association request frame may include capability information related to whether the constrained BSS mode is supported. The non-AP MLD may transmit an association response frame. The association response frame may include authorization information for association. The association response frame may include capability information related to whether or not the constrained BSS mode is supported.

At this time, if the non-AP MLD supports the Constrained BSS mode, the non-AP MLD may request activation of the Constrained BSS mode for some links during the multi-link setup process.

Figure 15:
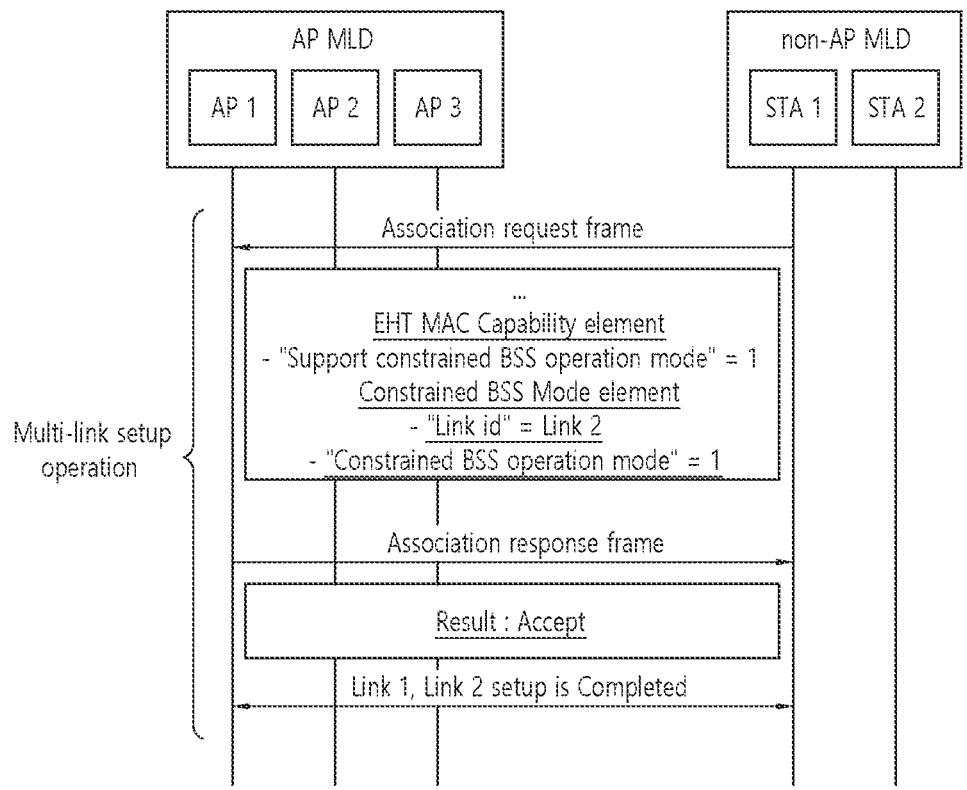
FIG. 15 is a diagram illustrating an embodiment of a mode setting method in a multi-link setup procedure.

FIG. 15 is a diagram illustrating an embodiment of a mode setting method in a multi-link setup procedure.

Referring to FIG. 15, the AP MLD may include AP1, AP2, and AP3, and the non-AP MLD may include STA1 and STA2. If the non-AP MLD supports the Constrained BSS mode, the non-AP MLD may transmit a request message for activating a specific link as the Constrained BSS mode during the multi-link setup process. At this time, if the AP MLD accepts, STA 2 operates in Constrained BSS mode after multi-link setup.

The Non-AP MLD may transmit an association request frame. The association request frame may include capability information related to whether the constrained BSS mode is supported and information related to whether the constrained BSS mode is used. The information related to whether the constrained BSS mode is used may include information related to which link will use the constrained BSS mode and information related to whether or not to use the constrained BSS mode. For example, if the link ID is related to link 2 and the information that the constrained BSS mode is used is included in the information related to whether the constrained BSS mode is used (e.g. Constrained BSS operation mode=1), Link 2 can operate in constrained BSS mode (or, the non-AP MLD may request the AP MLD to use link 2 as a constrained BSS mode). The AP MLD may transmit an association response frame. The association response frame may include authorization information for association. The association response frame may include capability information related to whether or not the constrained BSS mode is supported.

If the non-AP MLD wants to request deactivation of Constrained BSS mode, it must request release to the AP MLD using (re)Association frame.

Figure 16:
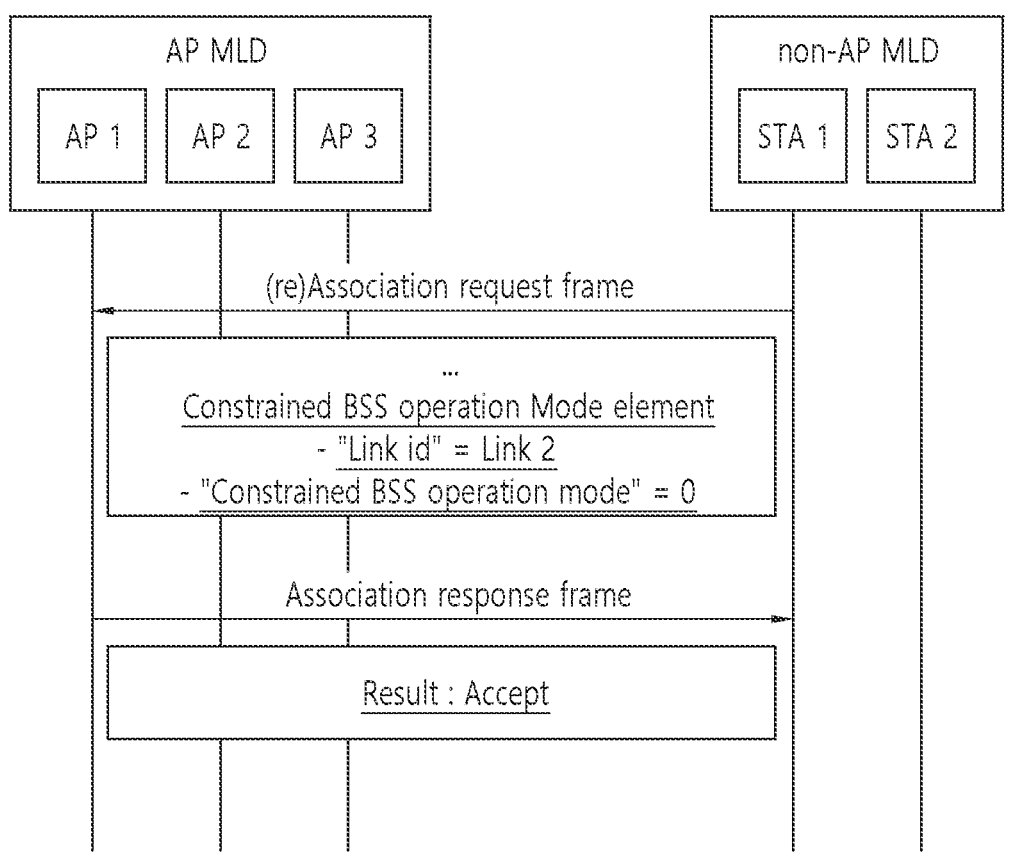
FIG. 16 is a diagram illustrating an embodiment of a mode release method after a multi-link setup procedure.

FIG. 16 is a diagram illustrating an embodiment of a mode release method after a multi-link setup procedure.

Referring to FIG. 16, the AP MLD may include AP1, AP2, and AP3, and the non-AP MLD may include STA1 and STA2. For example, if the non-AP MLD wants to request deactivation of Constrained BSS mode after multi-link setup, the non-AP MLD may request a release for a mode operating in a specific link using a (re)association frame.

The non-AP MLD may transmit a (re)association request frame to the AP MLD. The (re)association request frame may include information related to the constrained BSS mode. Information related to the constrained BSS mode may include link information and information related to whether or not the constrained BSS mode is used. For example, the link information may be related to link 2, and the information related to whether the constrained BSS mode is used may include information indicating that the constrained BSS mode is not used. In this case, the information related to the constrained BSS mode may include information that the non-AP MLD does not use the constrained BSS mode in link 2. For example, if the non-AP MLD was previously operating in constrained BSS mode on link 2, operation in constrained BSS mode on link 2 can be released. The AP MLD may transmit an association response frame. The association response frame may include permission information for releasing the constrained BSS mode.

Operation for setting/disabling mode during the Capability negotiation and multi-link setup process described above or later, may be set and release based on the same process for the Constrained BSS mode as well as Constrained CCA operation mode and enabled link mode proposed in the present specification.

Additionally, in the present specification, when an AP MLD and a non-AP MLD are associated for multi-link, a method for dynamically setting or releasing special functions for each link is proposed. The static method mentioned above can be useful, but using a separate management frame each time the mode is set/released can be overhead. Therefore, a method of controlling with a QoS Control field or EHT Control field (or EHT A-Control field), rather than a separate management frame, is additionally proposed.

First, "Constrained BSS operation mode" was defined to indicate the link function for power reduction. For example, this information could be included in a data or a QoS null frame if transmitted piggy back and this information can be transmitted by setting the QoS Control field or EHT Control field (or EHT A-Control field).

The non-AP MLD may request constrained BSS operation for some of the connected links to reduce its own power. If the value of "Constrained BSS operation mode" is 1, it means setting a mode that performs a constrained BSS operation for the transmission link, if the value is 0, it means that the mode of performing a constrained BSS operation on the transmission link is released. Therefore, if the STA of the non-AP MLD wants to constraint the BSS operation for some links to reduce power, the STA of the non-AP MLD transmits information about "Constrained BSS operation mode"=1 and link indicator information to the AP on a link that wants to perform a constrained BSS operation. At this time, the link indicator information may be omitted, if omitted, the AP considers it a request to apply the link function to the link through which the request frame is transmitted, and the AP transmits a response message. This message can also be transmitted through other links of the same non-AP MLD, other than the link whose operation is to be limited by utilizing multi-link characteristics. To this end, the STA may transmit link indicator information (i.e., Link ID) that the STA intends to indicate this mode along with information on "Constrained BSS operation mode"=1 in the request message.

The STA receiving the ACK or BA from the AP may then perform a constrained BSS operation on the requested link.

At this time, if a special function setting for a specific link is requested through a management frame (i.e., when the AP transmits a response frame), only when the STA receives an Accept response message from the AP, it performs a constrained BSS operation for the requested link. If the STA (the STA that received the response message to reject or failed to receive the response message due to transmission failure, etc.) does not receive the response message to accept, it must maintain the existing function without applying the link function to the requested link.

Figure 17:
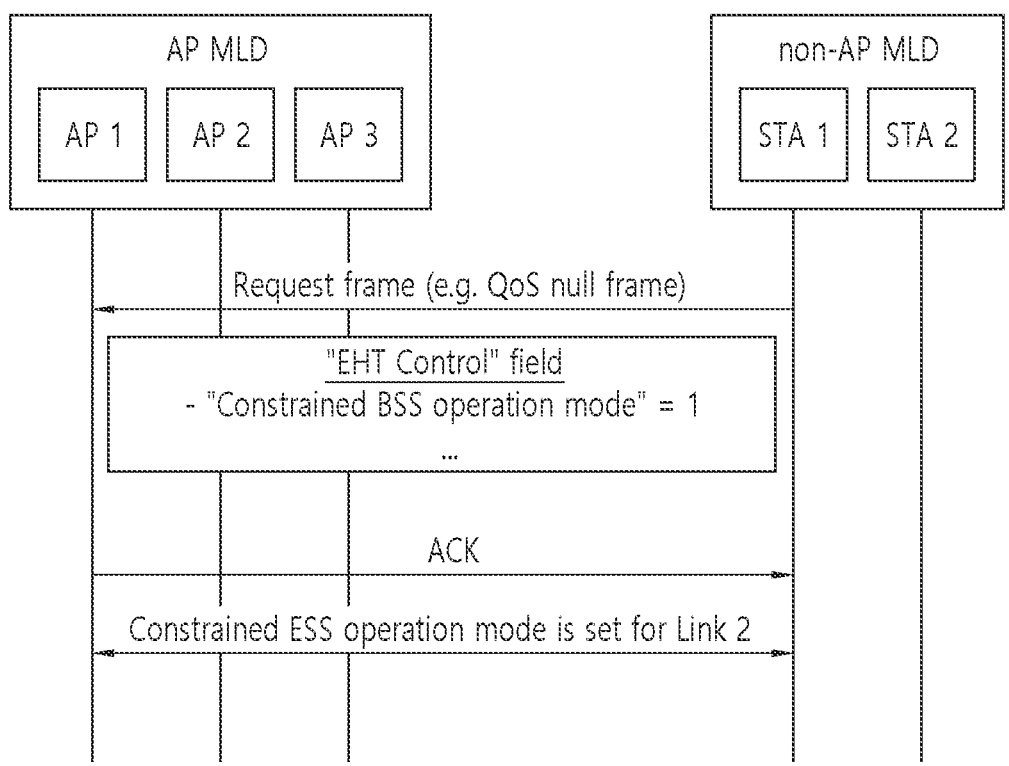
FIG. 17 is a diagram illustrating an embodiment of a method of setting a link function for one link.

FIG. 17 is a diagram illustrating an embodiment of a method of setting a link function for one link.

Referring to FIG. 17, the AP MLD may include AP1, AP2, and AP3, and the non-AP MLD may include STA1 and STA2. For example, when a non-AP MLD wants to configure a constrained BSS operation for Link 2 (i.e., STA 2), the non-AP MLD may transmit a request message. When STA 2 receives an ACK from the AP after requesting by setting the "Constrained BSS operation mode" value to 1 through link 2, STA 2 enters the doze state and then performs a constrained BSS operation. If there is no separate link indicator information, the AP MLD may perform a report operation that the requested link function setting has been requested for the transmitted link (i.e., Link 2 or STA 2).

The non-AP MLD may transmit a request frame (e.g., QoS null frame). The request frame may include information related to the constrained BSS mode. The information related to the constrained BSS mode may include information related to whether the constrained BSS mode operates. For example, STA2 may transmit a request frame including information indicating that it operates in the constrained BSS mode, and AP2 may receive it. AP2 may transmit ACK. After that, STA2 may operate in the constrained BSS mode.

Figure 18:
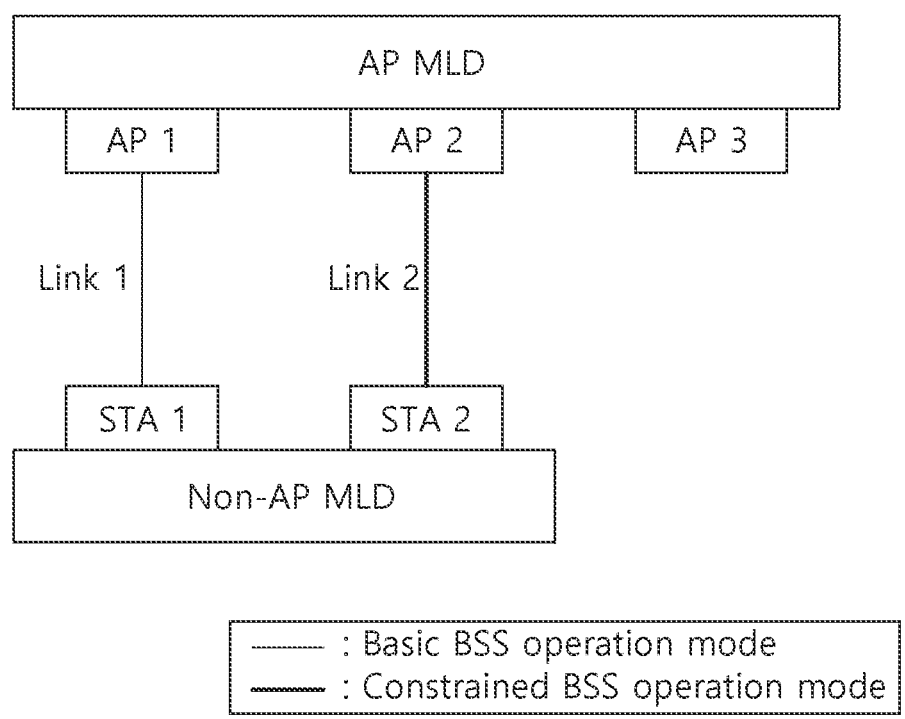
FIG. 18 is a diagram illustrating an embodiment of a link state after setting a mode.

FIG. 18 is a diagram illustrating an embodiment of a link state after setting a mode.

Referring to FIG. 18, the AP MLD may include AP1, AP2, and AP3, and the non-AP MLD may include STA1 and STA2. For example, an STA configured Constrained BSS operation mode for Link 2 performs Constrained BSS operation for STA 2, and STA 1 operates in Basic BSS operation mode. Therefore, since STA 2 maintains the Doze state if there is no separate explicit message, the AP MLD must transmit various information (e.g., critical update information, TIM information, etc.) for STA 2 through Link 1. If there is information to be received by itself through Link 1, STA 2 will be awake and receive the information.

At this time, this "Constrained BSS operation mode" can be applied to one or more links instead of one link.

Figure 19:
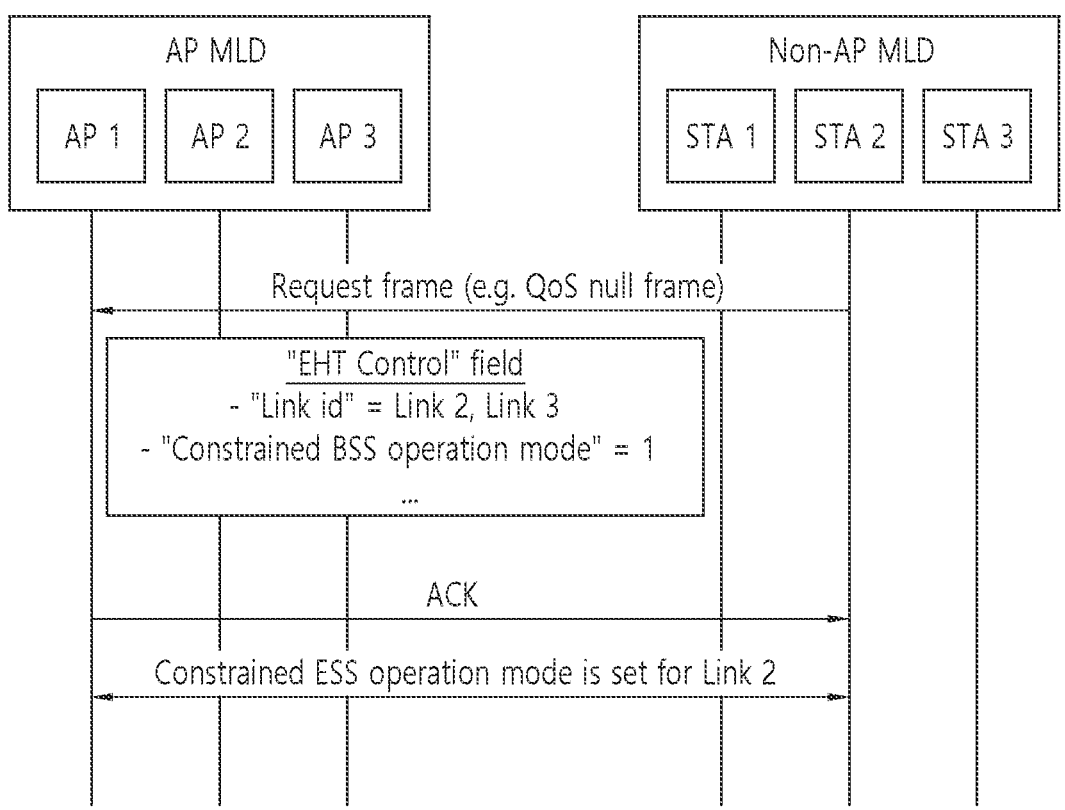
FIG. 19 is a diagram illustrating an embodiment of a method of setting a link function for multiple links.

FIG. 19 is a diagram illustrating an embodiment of a method of setting a link function for multiple links.

Referring to FIG. 19, the AP MLD may include AP1, AP2, and AP3, and the non-AP MLD may include STA1 and STA2. If a non-AP MLD requests Constrained BSS operation mode for one or more links, a request frame may include one or more link IDs. When the non-AP MLD sets and transmits the value of "Constrained BSS operation mode"=1 together with the link indicator information for which the non-AP MLD wants to configure the link function, and if the AP accepts the request, the non-AP MLD will perform Constrained BSS operation on Link 2 and Link 3.

The non-AP MLD may transmit a request frame (e.g., QoS null frame) to the AP MDL. The request frame may include information related to the constrained BSS mode. Information related to the constrained BSS mode may include information related to whether the constrained BSS mode operates and link information. For example, STA2 may transmit a request frame including information that link 2 and link 3 operate in the constrained BSS mode, AP2 can receive it. AP2 may transmit ACK. Link 2 and link 3 can then operate in the constrained BSS mode.

Figure 20:
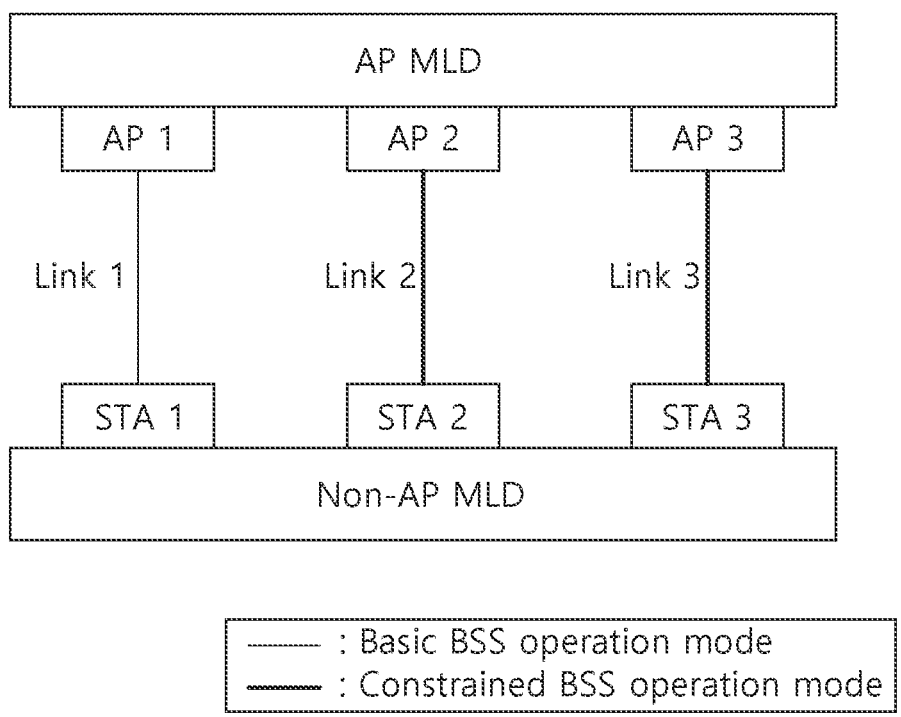
FIG. 20 is a diagram illustrating an embodiment of a link state after setting a mode.

FIG. 20 is a diagram illustrating an embodiment of a link state after setting a mode.

Referring to FIG. 20, the AP MLD may include AP1, AP2, and AP3, and the non-AP MLD may include STA1 and STA2. For example, if the non-AP MLD requested Constrained BSS operation mode for Link 2 and Link 3, Link 2 and Link 3 can be set to constrained BSS mode. The STA that has set Constrained BSS operation mode for Link 2 and Link 3 performs Constrained BSS operation for STA 2 and STA 3, and STA 1 operates in Basic BSS operation mode. Therefore, since STA 2 and STA 3 maintain the Doze state if there is no separate explicit message, the AP MLD must transmit various information (e.g., critical update information, TIM information, etc.) for STA 2 and STA 3 through Link 1. If there is information to be received by itself through Link 1, STA 2 and STA 3 will be awake and receive the information.

However, since non-AP MLD must perform basic BSS operation for at least one link, the non-AP MLD cannot set Constrained BSS operation mode=1 for all links. That is, not all links can be set to constrained BSS mode.

Through the above process, when a specific link (i.e., STA) of the non-AP MLD is set to Constrained BSS operation mode=1, the STA enters the doze state after receiving an ACK or Accept response message from the AP. From this time, the AP MLD must transmit various information considering the link operating in Constrained BSS operation mode. For example, assuming that when an AP MLD (AP1, AP2, AP3) including 3 APs and a non-AP MLD (STA1, STA2) including 2 STAs are associated, AP 1 and STA 1 are associated through Link 1 and AP 2 and STA 2 are connected through Link 2, after STA 2 requests Link 2 to operate in Constrained BSS mode, after AP 2 accepts, since AP MLD operates in Constrained BSS operation mode after STA 2, the AP MLD must transmit information (e.g., capability information, TIM information, etc.) and Management frame in Beacon to STA 2 through Link 1. Information of STA 2 transmitted through Link 1 may be shared by STA 2 through information sharing between MLDs.

In addition, each STA of the non-AP MLD can set or release the mode for each link, and can set several links in one frame. However, in this case, at least one link must be set as a general link. In other words, the non-AP MLD may set Constrained BSS operation mode=1 for a link corresponding to a minimum of 0 and a maximum of (the total number of links of the non-AP MLD)—1 among its own links. In other words, at least one link must be set as the default link for basic operation (beacon monitoring, etc.). That is, if all links operate in the constrained BSS mode, since the MLD cannot perform basic operations (e.g., receiving a beacon frame) through any link, at least one link must not operate in constrained BSS mode.

The dynamic link function setting method using such a "Constrained BSS operation mode" may not necessarily require the existence of the "Support link function" field and the "Support anchor link" field proposed above. These fields are information to inform which link function MLD supports, if it is assumed that MLD basically supports link functions (e.g., anchor link or primary link, etc.), these fields may be omitted. In other words, even if a separate link function support confirmation process is omitted in the link establishment process, the non-AP MLD may piggy back and transmit these filed as part of a data or a QoS null frame, or may set these field as a QoS Control field or EHT Control field (or EHT A-Control field) and transmit these field. In this case, the STA can increase autonomy by dynamically setting or releasing the special link function (e.g. "Constrained BSS operation mode") whenever the STA needs it.

Second, "Constrained CCA operation mode" is defined to indicate a link function to solve the inter-link interference problem when data is transmitted/received due to the non-STR capability of MLD. For example, this information may be included in data or a QoS null frame when transmitted piggy back when requested by the STA, this information can be transmitted by setting the QoS Control field or EHT Control field (or EHT A-Control field). Alternatively, when requested by the AP, change information may be included in a management frame (e.g., beacon, broadcast probe response) and transmitted. The AP MLD or the non-AP MLD may request constrained CCA operation for some of the connected links to avoid data collision that may occur during data transmission. When the "Constrained CCA operation mode" value is set to 1, it means to set a mode that performs a constrained CCA operation for the transmission link, if the value is 0, it means that the mode of performing the constrained CCA operation on the transmission link is released. Therefore, if an AP MLD or a non-AP MLD wants to limit CCA performance for some links to avoid data collision due to interference, the AP MLD or the non-AP MLD may request a configuration change or notify the changed configuration information by including information about "Constrained CCA operation mode"=1 and link indicator information through a link where a constrained CCA operation is desired to be performed. At this time, the link indicator information may be omitted, in case of omission, the request frame is regarded as a request or notification for applying a link function to the transmitted link. For example, if the STA transmits a mode setting information request frame to the AP without link indicator information, the AP recognizes this message as a request for the received link, when the AP transmits a message about changed configuration information to the STA without link indicator information, the STA recognizes this message as received link change information.

This message can also be transmitted through other links of the same non-AP MLD, other than the link whose operation is to be limited by utilizing multi-link characteristics. To this end, the AP or the STA transmits link indicator information (i.e., Link ID) to indicate this mode along with information on "Constrained CCA operation mode"=1 in the message. When the STA requests a mode change, the STA receiving an ACK or BA from the AP then performs a constrained CCA operation on the requested link. At this time, if the STA requests special function settings for a specific link through a management frame (i.e., when the AP transmits a response frame), only when the STA receives an Accept response message from the AP, it performs a constrained CCA operation on the requested link. The STA that did not receive (a STA that received a response message to reject or did not receive a response message due to transmission failure, etc.) must maintain the existing function without applying the link function to the requested link.

On the other hand, the STA receiving the mode change information from the AP then performs a constrained CCA operation on the requested link.

Figure 21:
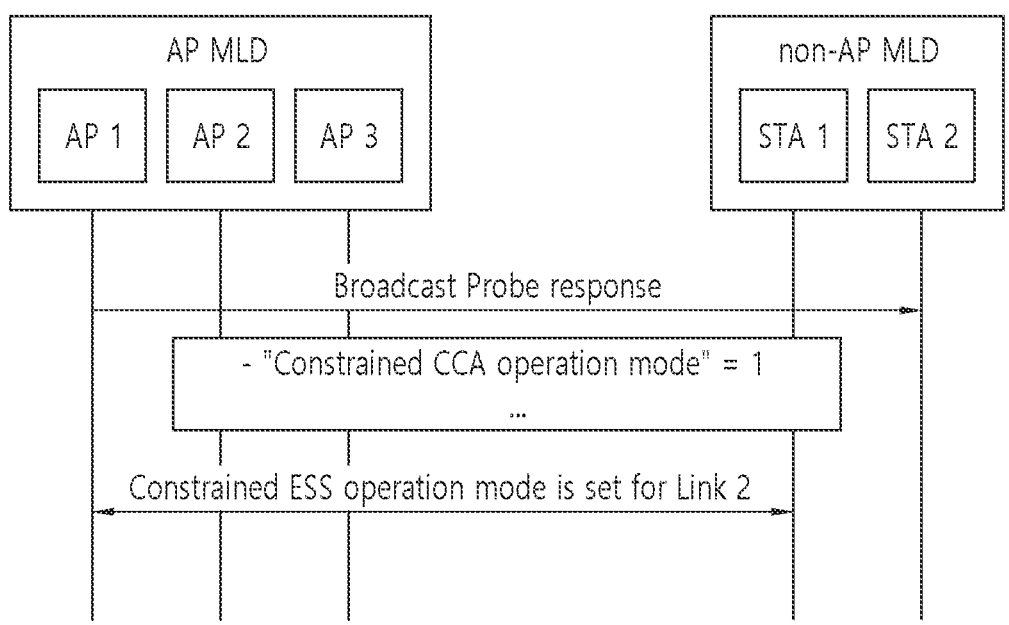
FIG. 21 is a diagram illustrating an embodiment of a method of setting a link function for one link.

FIG. 21 is a diagram illustrating an embodiment of a method of setting a link function for one link.

Referring to FIG. 21, the AP MLD may include AP1, AP2, and AP3, and the non-AP MLD may include STA1 and STA2. For example, if the AP changes Link 2 to a non-Primary link (i.e., if it changes Link 2 to operate in constrained CCA mode), the AP may inform the non-AP MLD of this change information through a Broadcast probe response frame. Upon receiving this information, STA 2 confirms that the AP MLD has configured Link 2 as a non-primary link, and then performs a constrained CCA operation on STA 2. In other words, after confirming that Link 2 is configured as a non-primary link, STA 2 then performs a Constrained CCA operation on its own link. The link state after setting the link function is shown in FIG. 22.

Figure 22:
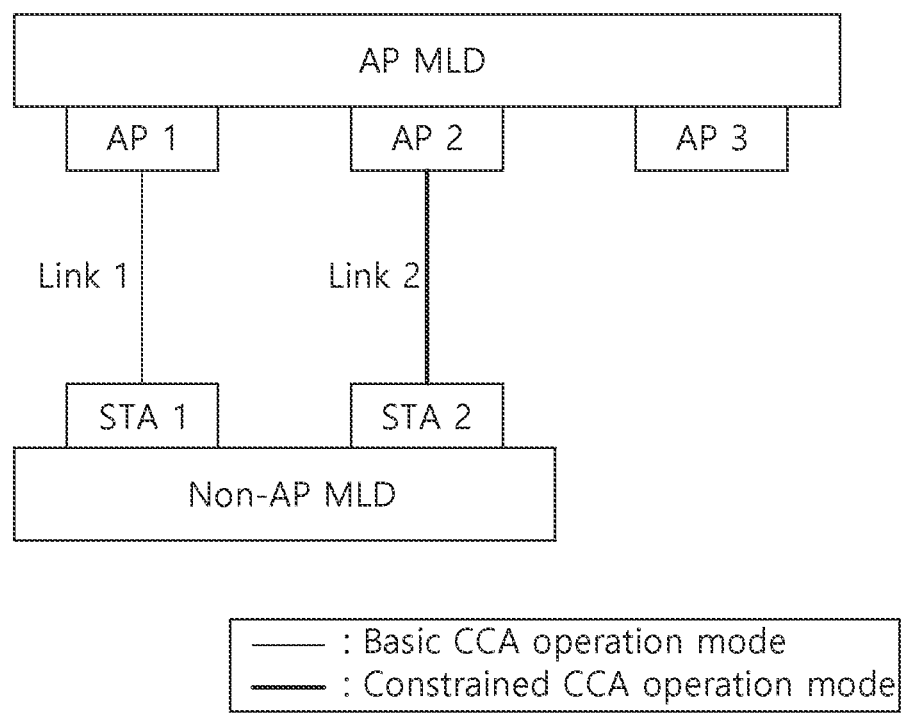
FIG. 22 is a diagram illustrating an embodiment of a link state after setting a mode.

FIG. 22 is a diagram illustrating an embodiment of a link state after setting a mode.

Referring to FIG. 22, the AP MLD may include AP1, AP2, and AP3, and the non-AP MLD may include STA1 and STA2. Link 1 may be a general link (e.g. primary link) that does not operate in constrained CCA mode, Link 2 may be a link operating in constrained CCA mode. At this time, this "Constrained CCA operation mode" can be applied to one or more links instead of one link. STA2 and/or AP2 cannot transmit data after performing CCA by itself, when STA1 and/or AP1 transmits data after performing CCA, only transmission through aggregation is possible.

Figure 23:
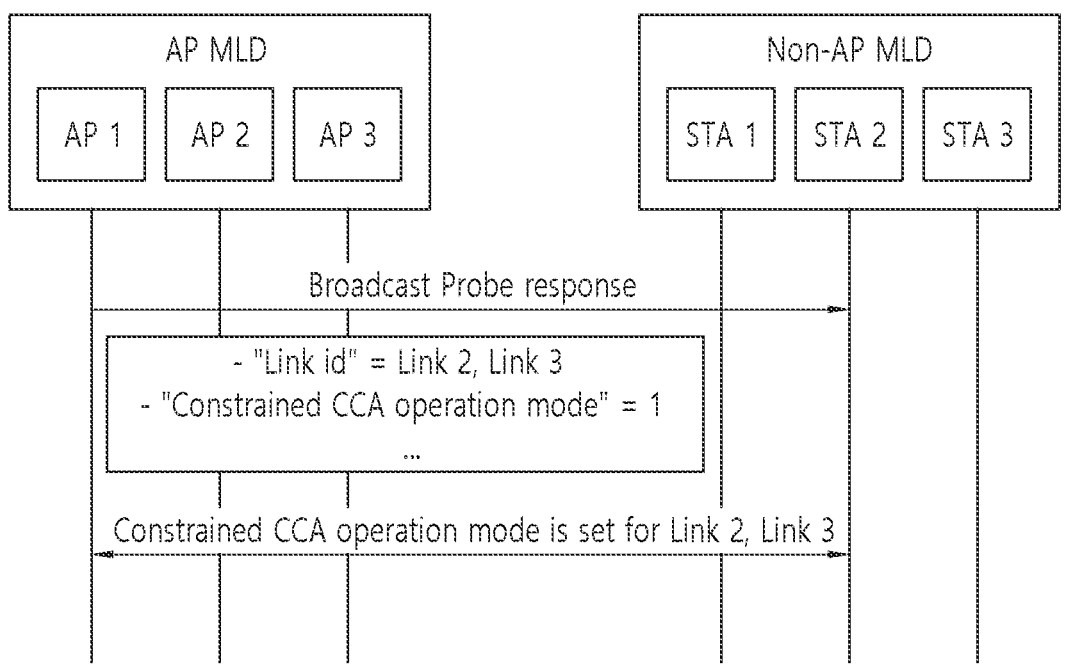
FIG. 23 is a diagram illustrating an embodiment of a method of setting a link function for multiple links.

FIG. 23 is a diagram illustrating an embodiment of a method of setting a link function for multiple links.

Referring to FIG. 23, the AP MLD may include AP1, AP2, and AP3, and the non-AP MLD may include STA1, STA2, and STA3. The AP MLD may indicate Constrained CCA operation mode for one or more links. When the AP MLD sets and transmits the value of "Constrained CCA operation mode"=1 together with the link indicator information (for example, Link ID of Link 2 and Link 3) for which the AP MLD wants to configure the link function, upon receiving this, the STA may check the information and perform a Constrained CCA operation on Link 2 and Link 3.

Figure 24:
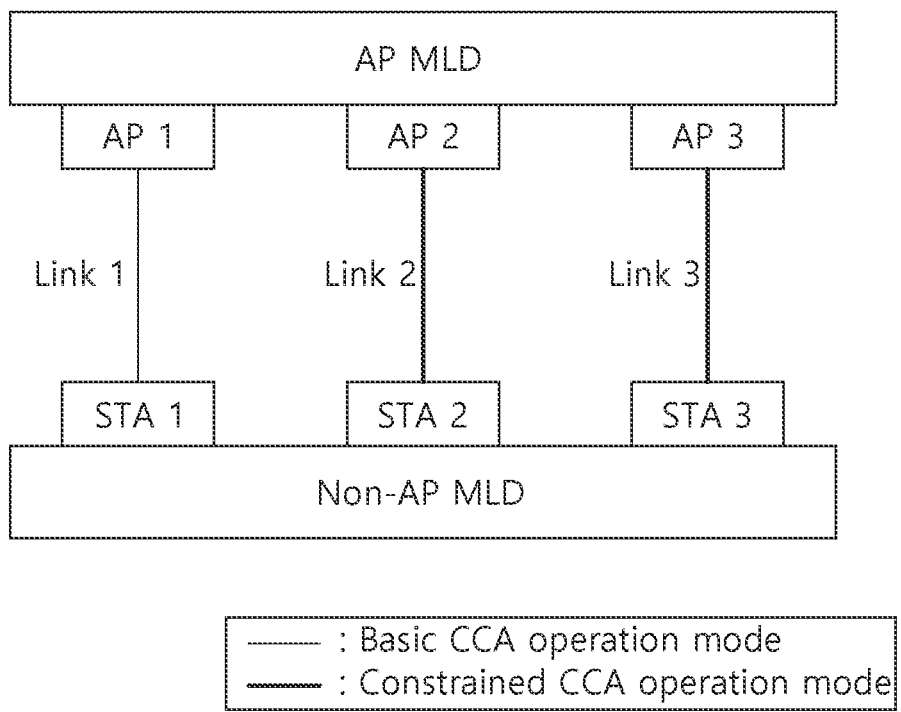
FIG. 24 is a diagram illustrating an embodiment of a link state after setting a mode.

FIG. 24 is a diagram illustrating an embodiment of a link state after setting a mode.

Referring to FIG. 24, the AP MLD may include AP1, AP2, and AP3, and the non-AP MLD may include STA1, STA2, and STA3. For example, the AP MLD may set Constrained CCA operation mode for Link 2 and Link 3. An STA that has set Constrained CCA operation mode for Link 2 and Link 3 performs Constrained CCA operation on STA2 and STA3, and STA1 operates in Basic CCA operation mode. Therefore, thereafter, STA2 and STA3 do not independently perform CCA except when the channel state of Link 1 is idle.

However, the AP MLD needs to perform basic CCA operation for at least one link, thus the AP MLD cannot set Constrained CCA operation mode=1 for all links. That is, not all links can operate in the constrained CCA mode. At least one link must not operate in constrained CCA mode.

Thirdly, "Enabled link mode" is defined to set some of the multi-links of the non-AP MLD as operating links (i.e., Enabled links). For example, this information may be piggy back and transmitted when requested by the STA, or may be included in a data or a QoS null frame, this information may be set as a QoS Control field or EHT Control field (or EHT A-Control field) and transmitted. The non-AP MLD may request the AP MLD to set some links as its operating links. When the EHT STA transmits a message, if the "Enabled link mode" value is set to 1, it may mean that the transmission link is set as an operating link, if the value is 0, it may mean that the transmission link is to be released from the operating link. Therefore, if the non-AP MLD wants to set some links as operating links, "Enabled link mode"=1 information and link indicator information can be included to request configuration or change of operating link. Conversely, if the non-AP MLD wants to release the operating link for some links, the non-AP MLD may request to release the operation link by including "Enabled link mode"=0 information and link indicator information. In this case, the link indicator information may be omitted. If omitted, it may mean a request for setting a corresponding mode for a link through which a request frame is transmitted. For example, when the STA transmits a mode setting request frame to the AP without link indicator information, the AP may recognize this message as a link establishment request for the received BSS. This message can also be transmitted through other links of the same non-AP MLD other than the link to be configured as an enabled link by utilizing multi-link characteristics. To this end, the STA transmits link indicator information (i.e., Link ID) to indicate this mode along with "Enabled link mode"=1 information in the message. When the STA requests a mode change, the STA receiving the ACK or BA from the AP may then perform an operation on the requested link as an enabled link. At this time, if a mode change is requested for a specific link through a management frame (i.e., when the AP transmits a Response frame), only when the STA receives a response message to accept from the AP can the STA set the requested link as an enabled link. The STA that did not receive (that is, the STA that received the response message to reject or did not receive the response message due to transmission failure, etc.) may maintain the existing link as the operating link without configuring the enabled link for the requested link.

Figure 25:
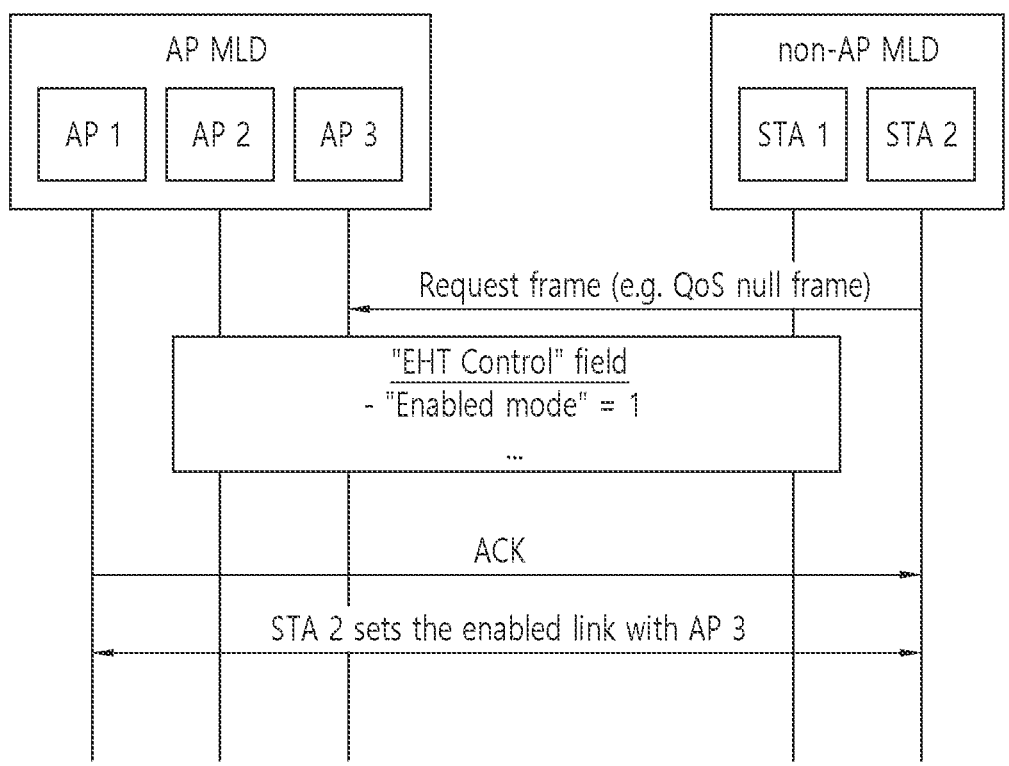
FIG. 25 is a diagram illustrating an embodiment of a method of setting a link function to a transmission link.

FIG. 25 is a diagram illustrating an embodiment of a method of setting a link function to a transmission link.

Referring to FIG. 25, the AP MLD may include AP1, AP2, and AP3, and the non-AP MLD may include STA1 and STA2. For example, when STA2 of the non-AP MLD wants to establish its operating link with AP 3, it may transmit a request message. However, this is possible only when the current AP 3 is not connected to other STAs of the non-AP MLD through an operating link. When STA 2 requests AP 3 to set the "Enabled link mode" value to 1, when receiving an ACK for this from the AP, STA 2 then performs all operations using the corresponding link as an enabled link. As in the example above, if there is no separate link indicator information, the MLD may perform an operation by reporting that the requested link function setting has been requested for the transmitted link.

Figure 26:
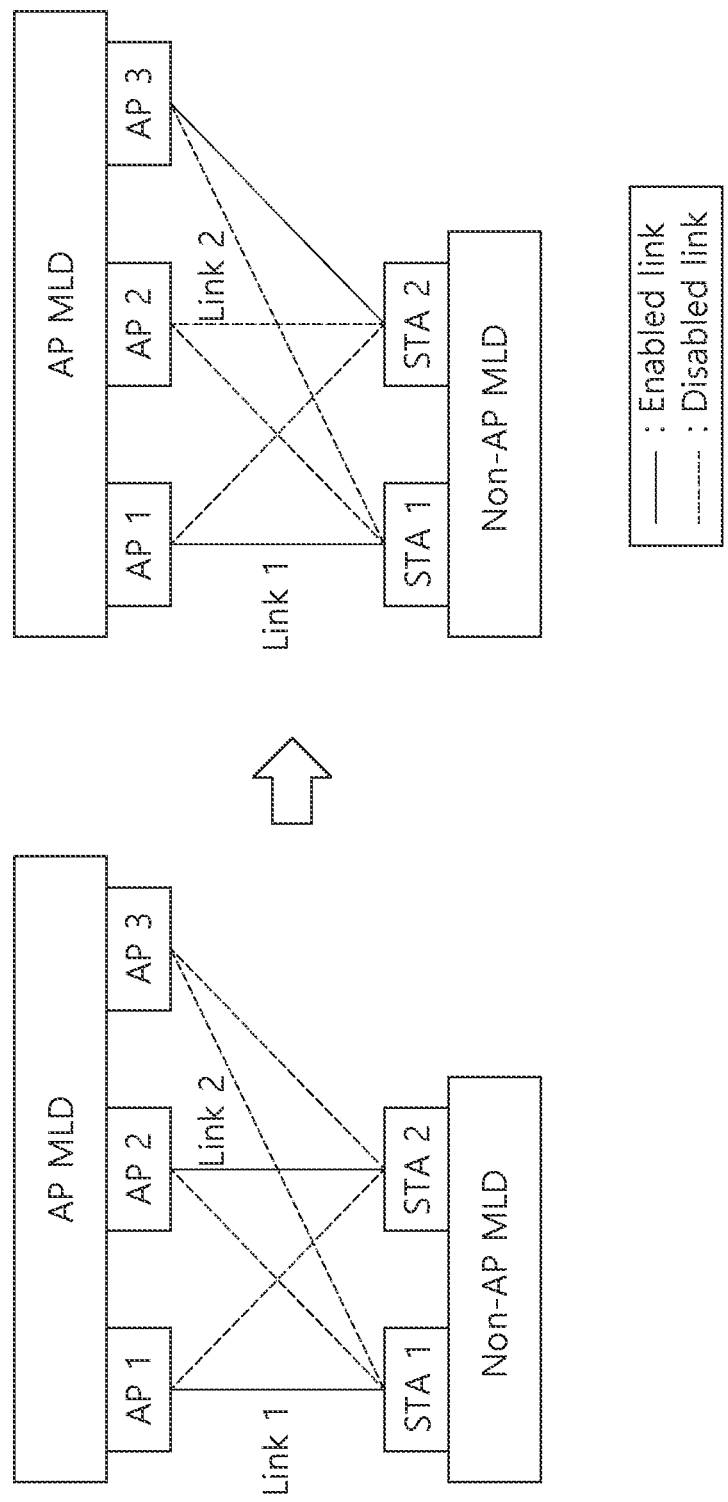
FIG. 26 is a diagram illustrating an embodiment of a link state after setting a mode.

FIG. 26 is a diagram illustrating an embodiment of a link state after setting a mode.

Referring to FIG. 26, the AP MLD may include AP1, AP2, and AP3, and the non-AP MLD may include STA1 and STA2. For example, STA 2 may be connected to AP 2 through link 2. When STA 2 transmits "Enabled link mode"=1 information to AP 3, AP 3 receiving the information can recognize that STA 2 configures it as an operating link for itself. Thereafter, STA 2 may establish an operating link with AP 3.

Figure 27:
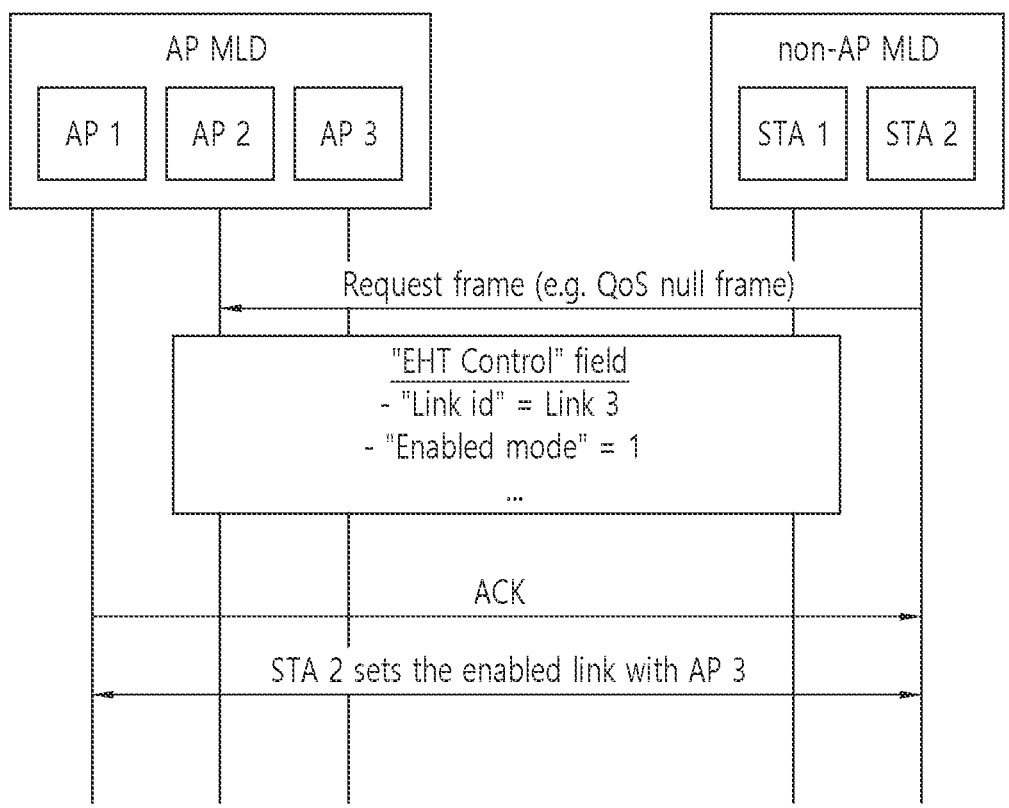
FIG. 27 is a diagram illustrating an embodiment of a method of setting a link function for another link.

FIG. 27 is a diagram illustrating an embodiment of a method of setting a link function for another link.

Referring to FIG. 27, the AP MLD may include AP1, AP2, and AP3, and the non-AP MLD may include STA1 and STA2. For example, the EHT STA may transmit link indicator information together with "Enabled link mode" configuration information. When STA2 is currently using Link 2 for AP2 as an operating link, and when STA2 wants to switch the operating link to AP3 and Link 3, STA2 can make a request as above. Then, when STA2 receives the ACK, STA2 can establish a link between AP3 and Link 3 and use it as an operating link.

Figure 28:
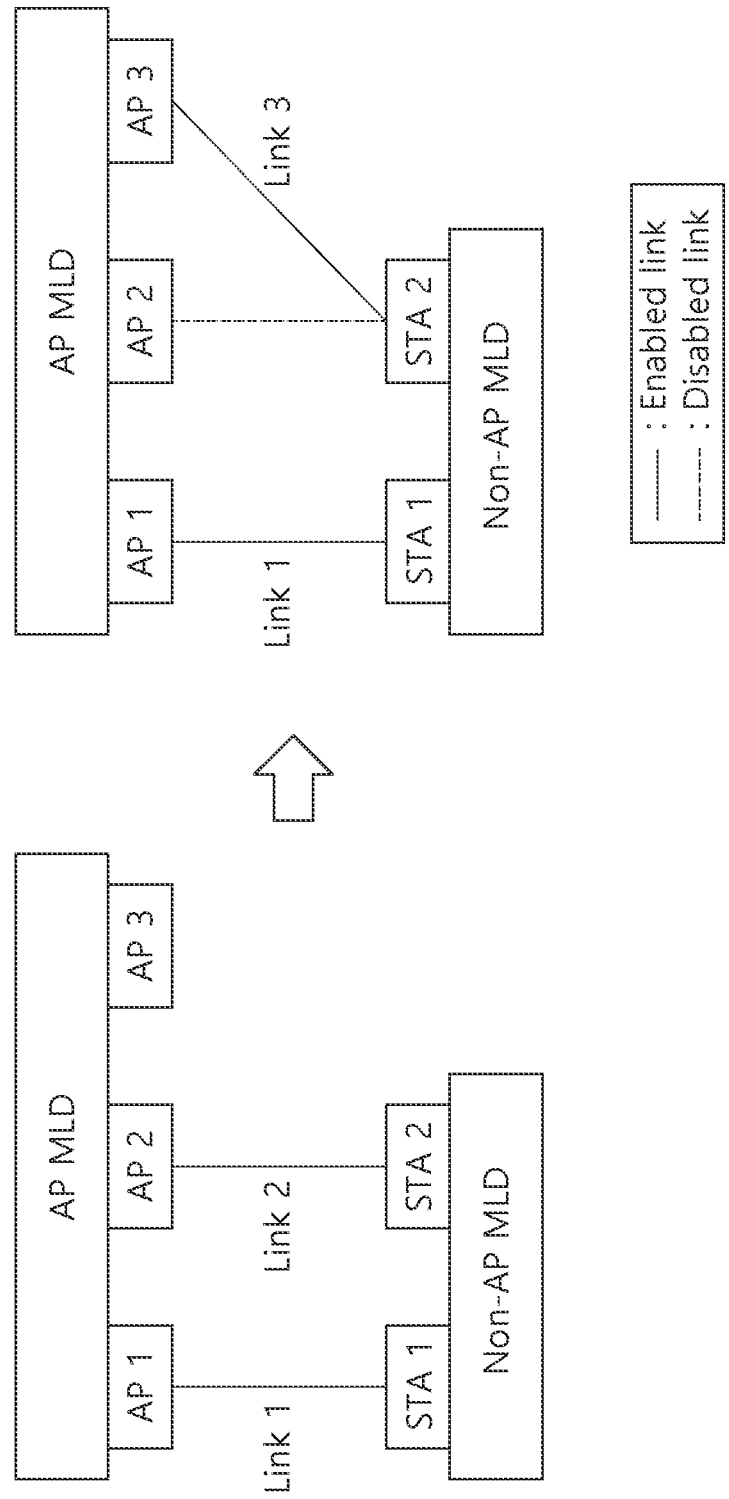
FIG. 28 is a diagram illustrating an embodiment of a link state after setting a mode.

FIG. 28 is a diagram illustrating an embodiment of a link state after setting a mode.

Referring to FIG. 28, the AP MLD may include AP1, AP2, and AP3, and the non-AP MLD may include STA1 and STA2. For example, when STA 2 requests Enabled link configuration for Link 3 for AP 3 as above and receives an ACK from AP 2, STA 2 resets AP 3 and Link 3 as operating links.

For reference, the dynamic link function setting method using such a "Constrained CCA operation mode" may not necessarily require the existence of the "Support link function" field, the "Support anchor link" field, and the "Enabled link mode" field proposed above. This field is information for indicating which link function the MLD supports, but if it is assumed that the MLD basically supports link functions (e.g., anchor link or primary link), the field may be omitted. In other words, in non-AP MLD, even if a separate link function support confirmation process is omitted in the link establishment process, this field can be piggy back and transmitted in data or a QoS null frames, or this field can be transmitted by setting it as a QoS Control field or EHT Control field (or EHT A-Control field). Alternatively, this information may be transmitted through a management frame. In this case, the AP or the STA can increase autonomy by dynamically setting or releasing a special link function (e.g., "Constrained CCA operation mode") whenever the AP or the STA needs it.

4. Information Management Method of AP MLD when Non-AP MLD Limited Link Function is Activated In Section 3 of this specification, a mode for performing Constrained BSS operation on some links of non-AP MLD for power saving is proposed and signaling for this is defined. As mentioned above, when some links of STAs in non-AP MLD perform constrained BSS operation (i.e., when constrained BSS operation mode is enabled), the link operating in constrained BSS mode does not perform operations such as monitoring (e.g., beacon) and maintains doze until there is a separate explicit signaling. At this time, the non-AP MLD must have a link that performs at least one basic BSS operation (i.e., general link) for monitoring. the non-AP MLD. The non-AP MLD must instead deliver notification information (e.g., traffic indication, critical update, etc.) for an STA having a link performing a constrained bss operation, through links performing these basic BSS operations. The AP MLD needs to know which link of the connected non-AP MLD is currently operating in Constrained BSS operation. Thus, the AP MLD manages notification information for the STA of the link, such that the AP MLD may transmit a frame (e.g., beacon, a group addressed frame, etc.) including notification information about an STA of the corresponding link through other AP (i.e., a link that operates as a general link or basic bss operation). To this end, the constrained BSS operation mode signaling proposed in this specification can be used.

At this time, three options can be considered in relation to notification information management of the AP MLD for the STA operating in Constrained BSS operation.

The first is a method in which each AP of the AP MLD manages notification information (e.g., traffic indication, TIM, etc.) of all STAs of the connected non-AP MLD. Currently, 11be is considering a method of transmitting information of other links through one link through cross-link signaling by utilizing multi-link characteristics. Since it is defined in 11be that the STA of non-AP MLD does not need to receive every beacon, in consideration of the case where an STA misses beacon information for various reasons (e.g., power saving, etc.), an AP of a connected AP MLD may transmit TIM information including and redundantly for all STAs of a connected non-AP MLD. Since the TIM information can indicate which STA currently has a buffered unit (BU), if there is an STA that needs to receive data, even if the beacon reception is missed, the corresponding STA can wake up through TIM information received through another link. In particular, this method can be usefully used when specific data can be transmitted only through a specific link through TID-link-mapping, or when high-priority data needs to be transmitted to the STA.

The second is a method in which the AP MLD manages notification information (e.g., traffic indication, TIM, etc.) of an STA operating in PS mode. In the current 11be, it is defined that each STA (i.e., each link) of the non-AP MLD can activate/deactivate the PS mode individually. STAs operating in PS mode also be awake based on the TBTT timing for monitoring. However, since this operation is not essential, this method is a method in which the other AP of the connecting AP MLD manages notification information for the STA instead of the STA operating in the PS mode. For example, when a BU occurs in an STA that has entered the doze state, the AP MLD needs to transmit a TIM to awake the STA, but it is not certain that the STA can receive it. Therefore, in this method, notification information for an STA operating in PS mode among non-AP MLDs connected to other APs of the same AP MLD is additionally included in the other AP of the connected AP MLD and transmitted. When the AP MLD receives the PS mode activation signaling from the STA of the connected non-AP MLD, the AP MLD transmits a beacon including various information (e.g., TIM, critical update information, etc.) for the STA through the other link. This method can prevent STAs from missing TIM information about STAs connected to links operating in PS mode when some links of the non-AP MLD operate in PS mode. The AP MLD transmits the beacon of the other link by additionally including the TIM information of the corresponding STA. Therefore, even if STAs operating in PS mode enter doze for a long time and miss beacon reception, they can receive information redundantly through links of other STAs. Therefore, it is possible to prevent the case of missing important notification information.

The third is a method in which the AP MLD manages notification information of an STA operating in Constrained BSS operation mode. In the present specification, a method for performing a constrained BSS operation for power reduction in an STA is proposed. At this time, this method is a method in which the other AP manages notification information for the STA for which the AP MLD activated the Constrained BSS operation mode instead. STAs in the existing PS mode can receive Beacon by being awake based on the TBTT timing, however, an STA operating in Constrained BSS operation mode maintains doze until there is explicit signaling regardless of TBTT. Accordingly, notification information for corresponding STAs is managed instead by other APs (i.e., links that perform basic BSS operations) connected to links that do not perform constrained BSS operations. For example, when the AP MLD receives signaling for Constrained BSS operation mode activation from an STA of a connected non-AP MLD, the AP MLD transmits various pieces of information (e.g., TIM, critical update information, etc.) about a corresponding STA to a beacon through a link that performs a basic operation. In this method, since the other AP instead manages only information about STAs that do not actually receive beacons, unnecessary overhead of transmitting redundant information can be reduced.

In this MLD environment, if the non-AP MLD supports the anchor link function, for various reasons, the STA may dynamically change its configured anchor link.

Therefore, in the following, various cases in which the non-AP STA changes the configured anchor link are described, and a suitable change method is proposed according to the case.

5. In Case of Changing Anchor Link of STA of Non-AP MLD

If the non-AP MLD supports the anchor link function for power reduction, the non-AP MLD may set one or more of multiple links, which the non-AP MLD has, as an anchor link. At this time, the AP MLD may support an anchor link list that can be used as an anchor link by a non-AP MLD as a set, in this case, the STA of the non-AP MLD must configure one link in this list as an anchor link.

At this time, the non-AP STA will set the most suitable link as the anchor link in consideration of the current BSS load condition and Link enable state.

At this time, the non-AP MLD may fix and use the anchor link statically, but may also dynamically change and use it dynamically. For example, to improve link performance (i.e. to avoid data load congestion), the non-AP MLD may change the anchor link or the non-AP MLD may reconfigure a new anchor link due to disconnection or termination of an existing anchor link. In this way, there are various cases in which the non-AP STA changes the configured anchor link, and examples thereof will be described below.

5.1 In Case of Changing Anchor Link to Improve Performance

After configuring the anchor link, the STA of the non-AP MLD may request to change its own anchor link to improve its performance.

Figure 29:
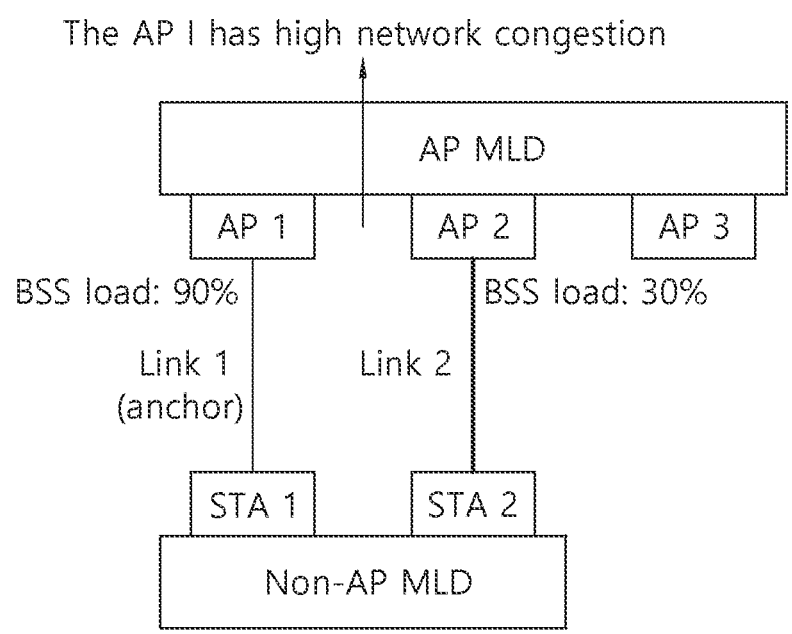
FIG. 29 is a diagram illustrating an embodiment of a link change method.

FIG. 29 is a diagram illustrating an embodiment of a link change method.

Referring to FIG. 29, the AP MLD may include AP1, AP2, and AP3, and the non-AP MLD may include STA1 and STA2. For example, STA1 of non-AP MLD is using Link 1 as an anchor link. At this time, data traffic on link 1 is concentrated, resulting in high network congestion. At this time, the non-AP MLD may confirm that the BSS Load for AP1 is 90% and the BSS Load for AP2 is 30%. This non-AP MLD may request a change of the anchor link to Link 2 with a relatively low BSS load to avoid data congestion.

5.2 In Case of Anchor Link Change Due to Link Disconnection

After configuring the anchor link, the STA of the non-AP MLD may request a new anchor link reset by disconnection or termination of the previously connected anchor link.

Figure 30:
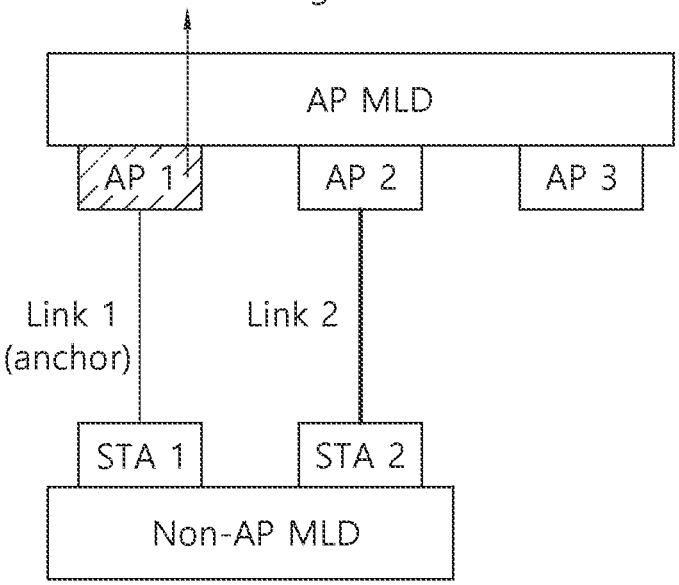
FIG. 30 is a diagram illustrating an embodiment of a method for changing an anchor link.

FIG. 30 is a diagram illustrating an embodiment of a method for changing an anchor link.

Referring to FIG. 30, the AP MLD may include AP1, AP2, and AP3, and the non-AP MLD may include STA1 and STA2. For example, non-AP MLD was using Link 1 as an anchor link. However, AP 1 of the AP MLD was turned off and the existing link 1 connection was disconnected. In this case, STA 1 may request reconfiguration with a new link and anchor link reconfiguration since the link connection of the existing anchor link is disconnected.

6. Anchor Link Change Method for STA of Non-AP MLD

Due to the cases mentioned in Sections 5.1 and 5.2 above, a non-AP MLD may change its own anchor link. In this case, another mechanism is required when changing the anchor link in the cases of Sections 5.1 and 5.2. In the case of Section 5.1, it may be a case where only the function of the anchor link is changed from link 1 to link 2 without changing the connection configuration of the existing link. On the other hand, in the case of Section 5.2, since the link operating as an anchor link is disconnected, the anchor link function must be reset along with the reset of the existing link. Therefore, when the non-AP MLD changes the anchor link, it is necessary to use an appropriate method considering various cases and circumstances. To this end, the present specification proposes various anchor link change methods.

6.1 How to Change the Anchor Link without Reconnecting the Link

This method is suitable for changing the anchor link without re-setting the link between the non-AP MLD and the AP MLD, as in the case of Section 5.1.

Figure 31:
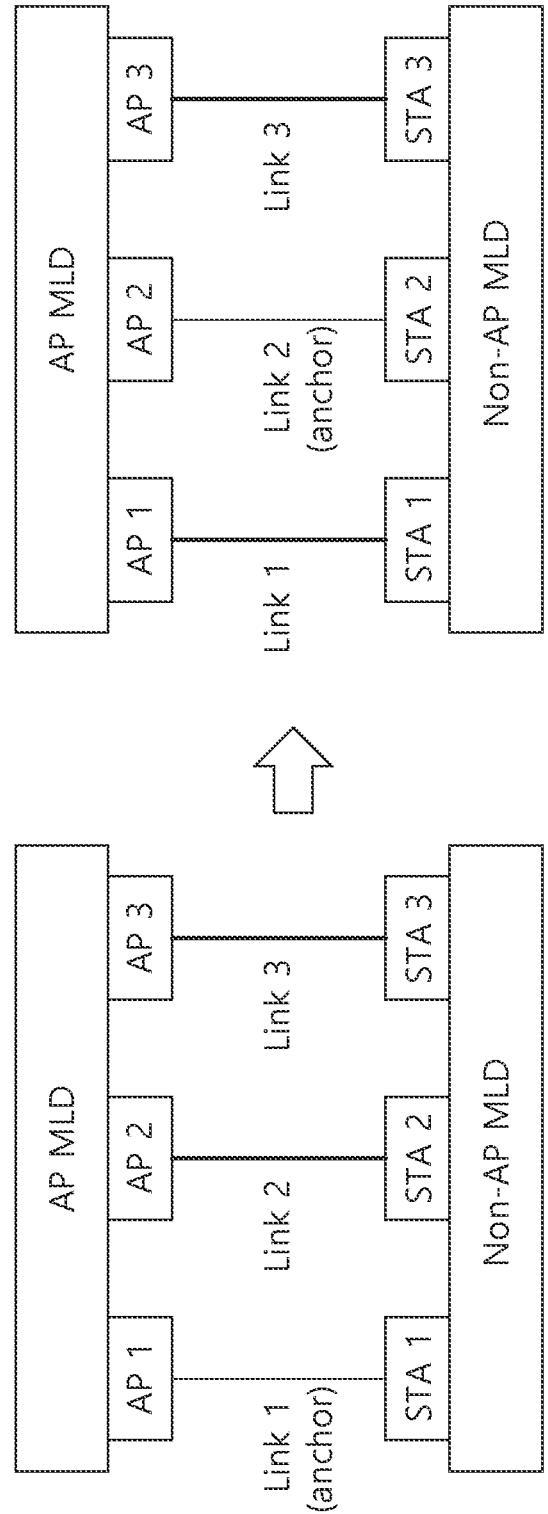
FIG. 31 is a diagram illustrating an embodiment of a method of changing an anchor link without link reconnection.

FIG. 31 is a diagram illustrating an embodiment of a method of changing an anchor link without link reconnection.

Referring to FIG. 31, the AP MLD may include AP1, AP2, and AP3, and the non-AP MLD may include STA1, STA2, and STA3. For example, a non-AP STA may change an anchor link function to another link to improve its own performance. At this time, the non-AP STA may transfer the function of the anchor link to another link of the same non-AP MLD. At this time, the existing link is not reset, and only the link operating as an anchor link can be changed.

For this, non-AP MLD and AP MLD need to exchange switching messages.

This switching message may be an existing management frame, or a new frame may be defined for this.

At this time, various information for changing the anchor link is required in the switching message, the contents of which are as follows.

Anchor link identifier: An anchor link identifier. This identifier is an identifier for indicating the anchor link to be changed by the STA, this identifier may be a separate Link ID for the anchor link, or a previously set Link ID or STA ID may be used as the anchor link ID. This information can be defined as an element or field or subfield.

Etc.

In the case of this method, since only the anchor link is changed without separate link resetting, the non-AP STA may request by including the "anchor link identifier" information to be changed in the switching request message. Then, when the AP accepts the request based on the information, the AP transmits a switching response message including Confirm contents. Upon receiving this, the STA considers that the anchor link of the non-AP MLD to which it belongs has changed, and operates based on the changed anchor link after reception. If the AP transmits a switching response message including the Decline content or the STA does not receive any switching response message, the existing anchor link is maintained without change. At this time, the switching request message and the switching response message may be transmitted through the existing anchor link or may be transmitted through another link (i.e., non-anchor link).

6.2 Method for Changing Anchor Link with Link Reconnection

As in the case of Section 5.2, this method is suitable for changing the anchor link along with reconfiguration of the link between the non-AP MLD and the AP MLD.

Figure 32:
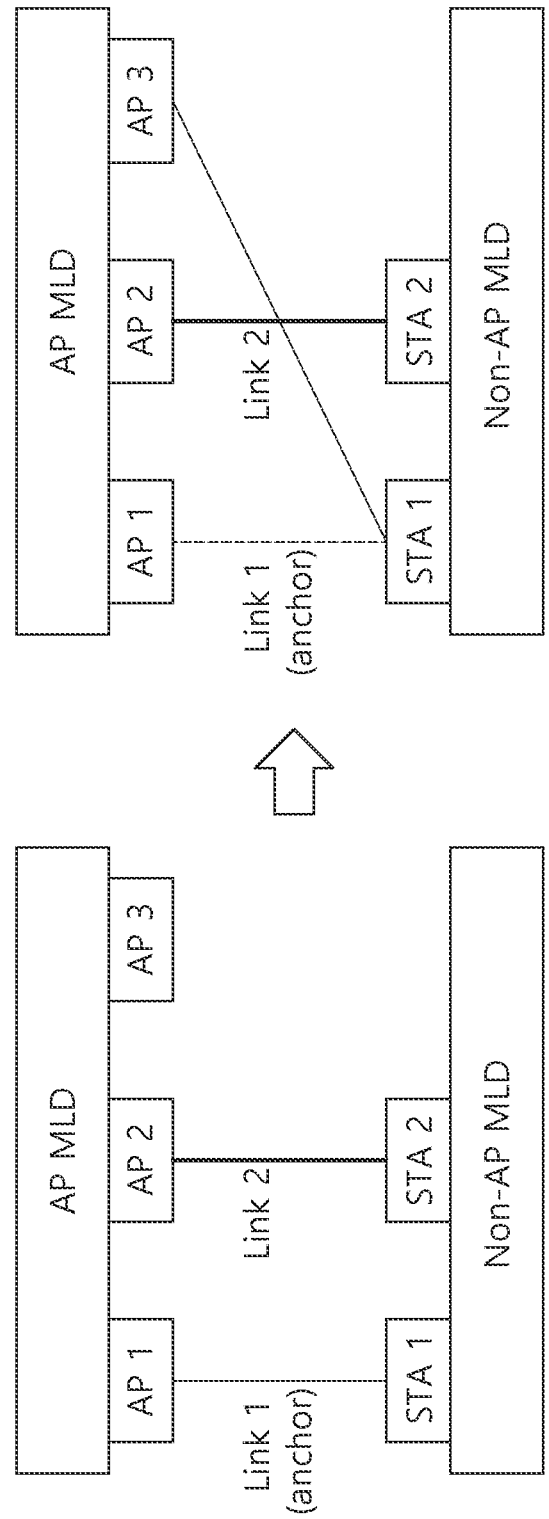
FIG. 32 is a diagram illustrating an embodiment of a method of changing an anchor link together with link reconnection.

FIG. 32 is a diagram illustrating an embodiment of a method of changing an anchor link together with link reconnection.

Referring to FIG. 32, the AP MLD may include AP1, AP2, and AP3, and the non-AP MLD may include STA1 and STA2. For example, this case may be a case in which a non-AP STA is disconnected from an existing anchor link and needs to set up a new anchor link. At this time, the non-AP STA may select one of the anchor link lists supported by the AP MLD and request reconfiguration of the anchor link (if AP MLD does not support anchor link list, one of enabled links can be selected). Additionally, this method also requires link re-setting along with anchor link change.

Since STA 1 is disconnected from Link 1, it needs to be reset to Link 1' with AP 3. At this time, if the existing Link 1 operated as an anchor link, the link reset for Link 1' with AP 3 may also perform anchor link reset. However, in this case, Link 2, not Link 1', may be reset as an anchor link. This case corresponds to the method in Section 4.2.1 mentioned above. For this, non-AP MLD and AP MLD need to exchange switching messages.

The switching message may be an existing management frame (e.g., (re)association frame or probe request/response frame), or a new frame may be defined for this.

At this time, various information for changing the anchor link is required in the switching message, the contents of which are as follows.

Anchor link identifier: An anchor link identifier. This identifier is an identifier for indicating the anchor link to be changed by the STA, this identifier may be a separate Link ID for the anchor link, or a previously set Link ID or STA ID may be used as the anchor link ID. This information can be defined as an element or field or subfield.

Link re-setup info: All information for STA to reset Link. This may be Link id or TID-to-link mapping information. Alternatively, all parameter information included in the existing (re)association frame may be included in this information. This information can be defined as an element or field or subfield.

Etc.

In the case of this embodiment, when the anchor link is changed, link resetting is also performed. Therefore, the non-AP STA may make a request by including "Link re-setup info" information along with "anchor link identifier" information to be changed in the switching request message. In this case, when the AP accepts the request based on the information, it transmits a switching response message including Confirm contents. At this time, the non-AP STA may use "Link re-setup info" information for link reconfiguration. Here, this information may include other information depending on whether setup with all APs in the AP MLD is performed during initial multi-link setup.

For example, if all APs and STAs in the AP MLD are setup during the initial multi-link setup process, STA 1 can reconnect to AP 3 and Link 1' by changing all TID information mapped to Link 1 connected to AP 1 to AP 3. If all APs and STAs in the AP MLD are not setup during the initial multi-link setup process, STA 1 may require an additional link reconfiguration mechanism when reconnecting with another AP.

Thereafter, the STA received the switching request message, the STA considered that its link is reset, additionally, the STA's link is considered to have been reset as an anchor link, and after reception, the STA operates based on the changed anchor link. If the AP transmits a switching response message including Decline content or the STA does not receive any switching response message, the existing content is not changed. Later, the non-AP MLD may request reconfiguration for the same link or request link reset or anchor link reconfiguration to another link.

At this time, the switching request message and the switching response message may be transmitted through the existing anchor link or may be transmitted through another link (i.e., non-anchor link).

Figure 33:
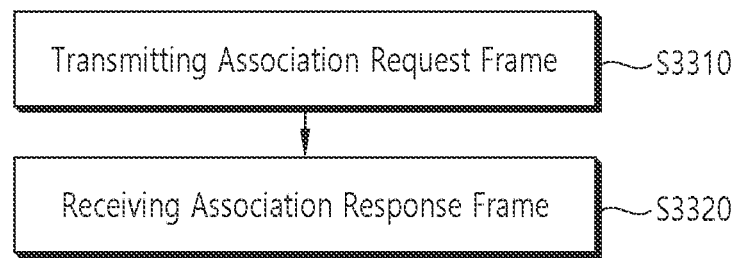
FIG. 33 is a diagram illustrating an embodiment of a transmitting MLD operation method.

FIG. 33 is a diagram illustrating an embodiment of a transmitting MLD operation method.

Referring to FIG. 33, a transmitting MLD includes a first STA (station) and a second STA, the first STA may operate on a first link, and the second STA may operate on a second link.

The transmitting MLD may transmit an association request frame (S3310). For example, the transmitting MLD may transmit an association request frame to the receiving MLD. For example, the association request frame may include capability information related to whether a limited basic service set (BSS) mode is supported and information related to use of the constrained BSS mode. For example, the information related to the use of the constrained BSS mode may include first information related to which STA among STAs included in the transmitting MLD operates in the constrained BSS mode. For example, the constrained BSS mode may mean a mode in which an STA operating in the constrained BSS acquires information to receive a signal from an STA not operating in the constrained BSS mode, and performs monitoring for signal reception.

For example, the first STA operates in the constrained BSS mode and the second STA does not operate in the constrained BSS mode, and the first STA may perform monitoring for signal reception based on that the first STA obtains information to receive a signal from the second STA.

For example, the association request frame may further include capability information related to whether a constrained clear channel assessment (CCA) mode is supported and information related to use of the constrained CCA mode. For example, the information related to the use of the constrained CCA mode may include information related to which STA among STAs included in the transmitting MLD operates in the constrained CCA mode. For example, the constrained CCA mode may mean a mode in which an STA operating in the constrained CCA mode does not perform CCA and transmits data based on a CCA performed by an STA not operating in the constrained CCA mode.

For example, the information related to the use of the constrained BSS mode may further include link identifier (ID) information.

For example, an STA operating in the constrained BSS may receive a beacon frame and a management frame.

The transmitting MLD may receive an association response frame (S3320). For example, the transmitting MLD may receive an association response frame from the receiving MLD.

For example, the transmitting MLD transmits a change request frame to the receiving MLD, the change request frame may include information related to use of the constrained BSS mode. For example, the information related to the use of the constrained BSS mode may include second information related to which STA among STAs included in the transmitting MLD operates in the constrained BSS mode.

For example, the first information may include information that the first STA operates in the constrained BSS mode. For example, the first STA may obtain information related to data reception from the second STA. For example, the first STA may receive a physical protocol data unit (PPDU) from the receiving MLD.

Constrained BSS operation mode (sub)field: A link configured for this mode (i.e., an STA set to "Constrained BSS operation mode"=1 through data exchange with an AP) performs only constrained BSS operations. As a method for reducing power consumption by using the characteristics of a non-AP MLD supporting multiple links, a link operating in Constrained BSS operation mode can basically maintain a doze state without performing beacon monitoring, unlike a general link. In a link operating in a constrained BSS operation mode, even if there is buffered data, the STA may awake and receive DL data only when a separate explicit instruction is given. For example, if TID-link-mapping is mapped to default mode (i.e., all TIDs) for all links in MLD, an AP MLD may transmit DL data to a non-AP MLD regardless of the link, but if a link is mapped to a specific TID, the AP MLD must transmit DL data only through a specific link of the non-AP MLD. Therefore, if TID-link-mapping is performed for each link for non-AP MLD, when the non-AP MLD is operating in a PS (power saving) mode, if some STAs enter the doze state, the AP MLD must awake the STA of the link mapped to a specific TID based on the TID of the DL data. If there is no separate explicit instruction, the link operating in the constrained BSS mode (i.e., the STA operating in the link), by maintaining the doze state without performing operations for beacon monitoring, management frame exchange, keep alive message exchange, etc. which are basically performed in a link, a STA connected to a corresponding link (i.e., a link operating in constrained BSS operation mode) can reduce power consumption. However, several frames (Beacon and management frames), etc., for STAs operating in Constrained BSS operation mode and having constraints can be replaced by transmitting to another link (i.e., anchor link) currently in the Awake state of the connected non-AP MLD. That is, an STA of a link not operating in the constrained BSS mode of the non-AP MLD may share information with an STA of a link operating in the constrained BSS mode. Constrained BSS operation mode indicated by this field may be the same as that of a non-anchor link. The STA of the Non-AP MLD can configure each link to operate as a non-anchor link by setting "Constrained BSS operation mode"=1 for each link, a link set to "Constrained BSS operation"=0 can operate as an anchor link that performs basic BSS operation in the same way as the existing general link. For example, when information (e.g., "Constrained BSS operation mode" field) for indicating a link function that performs a constrained BSS operation is piggy-backed and transmitted, it may be included in data or a QoS null frame, and may be included in a QoS Control field or EHT Control field (or EHT A-Control field) and transmitted. For example, 1 bit can be used to indicate whether or not a constrained BSS mode is set, and a value 1 can mean mode setting, and a value 0 can mean mode release. When requesting setting/release of the constrained BSS mode, "Link Identifier" information (e.g., Link ID or STA ID) is transmitted along with "Constrained BSS operation mode" setting information, so that the corresponding mode can be set/released for each link. The default value of the constrained BSS mode field is 0, and if there is no separate setting, the STA can perform basic BSS operation in the same way as the general link. For example, mode setting request information may be included in a separate management frame (e.g., probe request frame) and transmitted.

Constrained CCA operation mode (sub)field: A link set to this mode (i.e., an STA set to "Constrained CCA operation mode"=1 through data exchange with an AP) can perform a constrained CCA operation. As a method for solving interference issues that may occur due to non-STR capability caused by the characteristics of MLD supporting multiple links, a link operating in constrained CCA operation mode may perform constrained CCA for data transmission unlike a general link. In particular, the constrained CCA mode may be meaningful when the AP MLD supports non-STR capability. A link set in constrained CCA mode cannot perform independent CCA for data transmission, when it is determined that the channel is idle through the CCA of the general link of the same non-AP MLD (i.e., a link not set to constrained CCA mode), if data aggregation is desired, data can be transmitted using a link configured in constrained CCA mode. In other words, a link set in constrained CCA mode cannot be used as an independent link for data transmission/reception, it can be used only as a link additionally used when transmitting/receiving data through other general links. In 11be, a link that performs this restrictive CCA is referred to as a non-primary link, a link that performs general CCA is referred to as a primary link. However, the exact terms may change later. In order to avoid interference problems that may occur during data transmission/reception when the AP MLD is a non-STR capability, the AP MLD can avoid an inter-link interference problem by limiting CCA performance by using some links as non-primary links by considering a non-STR capability between links. Therefore, the Constrained CCA operation mode indicated by this (sub)field is the same as that of the non-Primary link. The AP of the AP MLD or the STA of the non-AP MLD sets "Constrained CCA operation mode"=1 for each link, the AP of the AP MLD or the STA of the non-AP MLD may configure the link to operate as a non-Primary link, a link set to "Constrained CCA operation"=0 operates as a primary link that performs basic CCA operation in the same way as the existing general link. For example, when information for indicating a link function performing a constrained CCA operation (e.g., Constrained CCA operation mode field) is piggy back and transmitted, it can be included in the data or a QoS null frame, and can be transmitted by setting the QoS Control field or EHT Control field (or EHT A-Control field). For example, 1 bit can be used to indicate whether or not a constrained CCA mode is set, and a value of 1 may mean mode setting, and a value of 0 may mean mode release. When requesting to set/release the corresponding mode, "Link Identifier" information (e.g., Link ID or STA ID) is transmitted together with "Constrained CCA operation mode" setting information, so that the corresponding mode can be set/unset for each link. The default value of the constrained CCA mode field is 0, and if there is no separate setting, the STA can perform a basic CCA operation identically to the general link. If the AP MLD sets this mode, the AP MLD may notify the non-AP MLD by including the corresponding change in a management frame (e.g., Beacon, Broadcast Probe response, etc.) whenever a corresponding bit value is changed.

Through the above process, when a specific link (i.e., STA) of the non-AP MLD is set to Constrained BSS operation mode=1, the STA enters the doze state after receiving an ACK or Accept response message from the AP. From this time, the AP MLD must transmit various information considering the link operating in Constrained BSS operation mode. For example, assuming that when an AP MLD (AP1, AP2, AP3) including 3 APs and a non-AP MLD (STA1, STA2) including 2 STAs are associated, AP 1 and STA 1 are associated through Link 1 and AP 2 and STA 2 are connected through Link 2, after STA 2 requests Link 2 to operate in Constrained BSS mode, after AP 2 accepts, since AP MLD operates in Constrained BSS operation mode after STA 2, the AP MLD must transmit information (e.g., capability information, TIM information, etc.) and a Management frame in Beacon to STA 2 through Link 1. Information of STA 2 transmitted through Link 1 may be shared by STA 2 through information sharing between MLDs.

In addition, each STA of the non-AP MLD can set or release the mode for each link, and can set several links in one frame. However, in this case, at least one link must be set as a general link. In other words, the non-AP MLD may set Constrained BSS operation mode=1 for a link corresponding to a minimum of 0 and a maximum of (the total number of links of the non-AP MLD)—1 among its own links. In other words, at least one link must be set as the default link for basic operation (beacon monitoring, etc.). That is, if all links operate in the constrained BSS mode, since the MLD cannot perform basic operations (e.g., receiving a beacon frame) through any link, at least one link must not operate in constrained BSS mode.

The dynamic link function setting method using such a "Constrained BSS operation mode" may not necessarily require the existence of the "Support link function" field and the "Support anchor link" field proposed above. These fields are information to inform which link function MLD supports, if it is assumed that MLD basically supports link functions (e.g., anchor link or primary link, etc.), these fields may be omitted. In other words, even if a separate link function support confirmation process is omitted in the link establishment process, the non-AP MLD may piggy back and transmit these filed as part of a data or a QoS null frame, or may set these field as a QoS Control field or EHT Control field (or EHT A-Control field) and transmit these field. In this case, the STA can increase autonomy by dynamically setting or releasing the special link function (e.g. "Constrained BSS operation mode") whenever the STA needs it.

Second, "Constrained CCA operation mode" is defined to indicate a link function to solve the inter-link interference problem when data is transmitted/received due to the non-STR capability of MLD. For example, this information may be included in data or a QoS null frame when transmitted piggy back when requested by the STA, this information can be transmitted by setting the QoS Control field or EHT Control field (or EHT A-Control field). Alternatively, when requested by the AP, change information may be included in a management frame (e.g., beacon, broadcast probe response) and transmitted. The AP MLD or the non-AP MLD may request constrained CCA operation for some of the connected links to avoid data collision that may occur during data transmission. When the "Constrained CCA operation mode" value is set to 1, it means to set a mode that performs a constrained CCA operation for the transmission link, if the value is 0, it means that the mode of performing the constrained CCA operation on the transmission link is released. Therefore, if an AP MLD or a non-AP MLD wants to limit CCA performance for some links to avoid data collision due to interference, the AP MLD or the non-AP MLD may request a configuration change or notify the changed configuration information by including information about "Constrained CCA operation mode"=1 and link indicator information through a link where a constrained CCA operation is desired to be performed. At this time, the link indicator information may be omitted, in case of omission, the request frame is regarded as a request or notification for applying a link function to the transmitted link. For example, if the STA transmits a mode setting information request a frame to the AP without link indicator information, the AP recognizes this message as a request for the received link, when the AP transmits a message about changed configuration information to the STA without link indicator information, the STA recognizes this message as received link change information.

This message can also be transmitted through other links of the same non-AP MLD, other than the link whose operation is to be limited by utilizing multi-link characteristics. To this end, the AP or the STA transmits link indicator information (i.e., Link ID) to indicate this mode along with information on "Constrained CCA operation mode"=1 in the message. When the STA requests a mode change, the STA receiving an ACK or BA from the AP then performs a constrained CCA operation on the requested link. At this time, if the STA requests special function settings for a specific link through a management frame (i.e., when the AP transmits a response frame), only when the STA receives an Accept response message from the AP, it performs a constrained CCA operation on the requested link. The STA that did not receive (a STA that received a response message to reject or did not receive a response message due to transmission failure, etc.) must maintain the existing function without applying the link function to the requested link.

Figure 34:
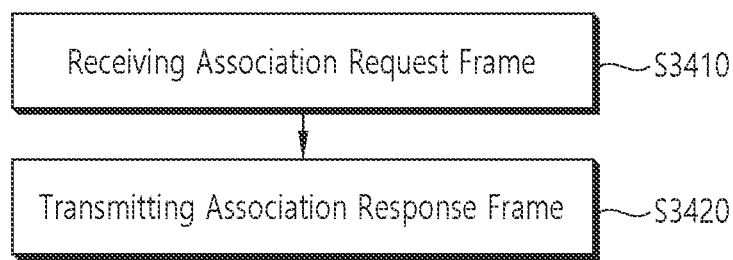
FIG. 34 is a diagram illustrating an embodiment of a receiving MLD operation method.

FIG. 34 is a diagram illustrating an embodiment of a receiving MLD operation method.

Referring to FIG. 34, a transmitting MLD includes a first STA (station) and a second STA, the first STA may operate on a first link, and the second STA may operate on a second link.

The receiving MLD may receive an association request frame (S3410). For example, the receiving MLD may receive an association request frame from the transmitting MLD. For example, the association request frame may include capability information related to whether a limited basic service set (BSS) mode is supported and information related to use of the constrained BSS mode. For example, the information related to the use of the constrained BSS mode may include first information related to which STA among STAs included in the transmitting MLD operates in the constrained BSS mode. For example, the constrained BSS mode may mean a mode in which an STA operating in the constrained BSS acquires information to receive a signal from an STA not operating in the constrained BSS mode, and performs monitoring for signal reception.

For example, the first STA operates in the constrained BSS mode and the second STA does not operate in the constrained BSS mode, and the first STA may perform monitoring for signal reception based on that the first STA obtains information to receive a signal from the second STA.

For example, the association request frame may further include capability information related to whether a constrained clear channel assessment (CCA) mode is supported and information related to use of the constrained CCA mode. For example, the information related to the use of the constrained CCA mode may include information related to which STA among STAs included in the transmitting MLD operates in the constrained CCA mode. For example, the constrained CCA mode may mean a mode in which an STA operating in the constrained CCA mode does not perform CCA and transmits data based on a CCA performed by an STA not operating in the constrained CCA mode.

For example, the information related to the use of the constrained BSS mode may further include link identifier (ID) information.

For example, an STA operating in the constrained BSS may receive a beacon frame and a management frame.

The receiving MLD may transmit an association response frame (S3420). For example, the receiving MLD may transmit an association response frame to the transmitting MLD.

For example, the transmitting MLD transmits a change request frame to the receiving MLD, the change request frame may include information related to use of the constrained BSS mode. For example, the information related to the use of the constrained BSS mode may include second information related to which STA among STAs included in the transmitting MLD operates in the constrained BSS mode.

For example, the first information may include information that the first STA operates in the constrained BSS mode. For example, the first STA may obtain information related to data reception from the second STA. For example, the first STA may receive a physical protocol data unit (PPDU) from the receiving MLD.

Some of the detailed steps shown in the examples of FIGS. 33 and 34 may not be essential steps and may be omitted. In addition to the steps shown in FIGS. 33 and 34, other steps may be added, and the order of the steps may be changed. Some of the above steps may have their own technical meaning.

The technical features of the present specification described above may be applied to various devices and methods. For example, the technical features of the present specification described above may be performed/supported through the device of FIGS. 1 and/or 5. For example, the technical features of the present specification described above may be applied only to a part of FIGS. 1 and/or 5. For example, the technical features of the present specification described above are implemented based on the processing chips 114 and 124 of FIG. 1, or implemented based on the processors 111 and 121 and the memories 112 and 122 of FIG. 1, or may be implemented based on the processor 610 and the memory 620 of FIG. 5. For example, in the device of the present specification, the device includes a memory and a processor operably coupled to the memory, the processor is adapted to perform operations including: transmitting capability information related to whether power saving is supported to the receiving MLD, wherein the power saving is performed by one of first to third power saving methods; and transmitting a control frame including method information related to which of the first to third power saving methods to be used to the receiving MLD.

The technical features of the present specification may be implemented based on a CRM (computer readable medium). For example, the CRM proposed by the present specification, which is at least one computer-readable recording medium (computer readable medium) including instructions based on being executed by at least one processor of a transmitting MLD(multi-link device) of a wireless local area network (Wireless Local Area Network) system. Based on that the instructions being executed by the at least one processor of the transmitting MLD, the transmitting MLD may include a first station (STA) and a second STA, the first STA operates on a first link, and the second STA operates on a second link, transmitting capability information related to whether or not power saving is supported to the receiving MLD, wherein the power saving is performed by one of first to third power saving methods; and transmitting a control frame including method information related to which of the first to third power saving methods to be used to the receiving MLD.

Instructions stored in the CRM of the present specification may be executed by at least one processor. At least one processor related to the CRM of the present specification may be the processors 111 and 121 or the processing chips 114 and 124 of FIG. 1 or the processor 610 of FIG. 5. Meanwhile, the CRM of this specification may be the memories 112 and 122 of FIG. 1, the memory 620 of FIG. 5, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a transmitting multi-link device (MLD) in a wireless local area network (WLAN) system, the method comprising:

transmitting an association request frame to a receiving MLD, wherein the transmitting MLD includes a first station (STA) and a second STA, the first STA operates on a first link, and the second STA operates on a second link, wherein the association request frame includes capability information related to whether a constrained basic service set (BSS) mode is supported and information related to use of the constrained BSS mode, wherein the information related to the use of the constrained BSS mode includes first information related to which STA operates in the constrained BSS mode among STAs included in the transmitting MLD, wherein the constrained BSS mode means a mode in which the STA operating in the constrained BSS mode performs monitoring for signal reception based on obtaining information to receive a signal from an STA not operating in the constrained BSS mode; and receiving an association response frame from the receiving MLD.

2. The method of claim 1, wherein the first STA operates in the constrained BSS mode, and the second STA does not operate in the constrained BSS mode, and wherein the first STA perform monitoring for signal reception, based on that information to receive a signal is received from the second STA.

3. The method of claim 1, wherein the association request frame further includes capability information related to whether a constrained clear channel assessment (CCA) mode is supported and information related to use of the constrained CCA mode, wherein the information related to the use of the constrained CCA mode includes information related to which STA among STAs included in the transmitting MLD operates in the constrained CCA mode, and wherein the constrained CCA mode mean a mode in which an STA operating in the constrained CCA mode does not perform CCA, and transmits data based on a CCA performed by an STA not operating in the constrained CCA mode.

4. The method of claim 1, wherein the information related to the use of the constrained BSS mode further includes link identifier (ID) information.

5. The method of claim 1, further comprising:

transmitting a change request frame to the receiving MLD, wherein the change request frame includes information related to use of the constrained BSS mode, wherein the information related to the use of the constrained BSS mode includes second information related to which STA among STAs included in the transmitting MLD operates in the constrained BSS mode.

6. The method of claim 1,
wherein the STA operating in the constrained BSS mode does not receive a beacon frame and a management frame.

7. The method of claim 1, further comprising:
obtaining, by the first STA, information related to data reception from the second STA, wherein the first information includes information that the first STA operates in the constrained BSS mode; and
receiving, by the first STA, a physical protocol data unit (PPDU) from the receiving MLD.

8. A transmitting multi-link device (MLD) configured to operate in a wireless local area network (WLAN) system, the transmitting MLD comprising:
a transceiver including a first station (STA) operating on a first link and a second STA operating on a second link;
a processor coupled to the transceiver; and
a memory coupled to the processor and storing instructions that, when executed by the processor, perform operations comprising:
transmitting an association request frame to a receiving MLD,
wherein the association request frame includes capability information related to whether a constrained basic service set (BSS) mode is supported and information related to use of the constrained BSS mode,
wherein the information related to the use of the constrained BSS mode includes first information related to which STA operates in the constrained BSS mode among STAs included in the transmitting MLD,
wherein the constrained BSS mode means a mode in which the STA operating in the constrained BSS mode performs monitoring for signal reception based on obtaining information to receive a signal from an STA not operating in the constrained BSS mode; and
receiving an association response frame from the receiving MLD.

9. The transmitting MLD of claim 8,
wherein the first STA operates in the constrained BSS mode, and the second STA does not operate in the constrained BSS mode, and
wherein the first STA perform monitoring for signal reception, based on that information to receive a signal is received from the second STA.

10. The transmitting MLD of claim 8,
wherein the association request frame further includes capability information related to whether a constrained clear channel assessment (CCA) mode is supported and information related to use of the constrained CCA mode,
wherein the information related to the use of the constrained CCA mode includes information related to which STA among STAs included in the transmitting MLD operates in the constrained CCA mode, and
wherein the constrained CCA mode mean a mode in which an STA operating in the constrained CCA mode does not perform CCA, and transmits data based on a CCA performed by an STA not operating in the constrained CCA mode.

11. The transmitting MLD of claim 8,
wherein the information related to the use of the constrained BSS mode further includes link identifier (ID) information.

12. The transmitting MLD of claim 8, wherein the operations further comprise:
transmitting a change request frame to the receiving MLD, wherein the change request frame includes information related to use of the constrained BSS mode,
wherein the information related to the use of the constrained BSS mode includes second information related to which STA among STAs included in the transmitting MLD operates in the constrained BSS mode.

13. The transmitting MLD of claim 8,
wherein the STA operating in the constrained BSS mode does not receive a beacon frame and a management frame.

14. The transmitting MLD of claim 8,
wherein the first information includes information that the first STA operates in the constrained BSS mode, and
wherein the operations further comprise:
obtaining, by the first STA, information related to data reception from the second STA; and
receiving, by the first STA, a physical protocol data unit (PPDU) from the receiving MLD.

15. A method performed by a receiving multi-link device (MLD) in a wireless local area network (WLAN) system, the method comprising:
receiving an association request frame to a transmitting MLD, wherein the transmitting MLD includes a first station (STA) operating on a first link and a second STA operating on a second link,
wherein the association request frame includes capability information related to whether a constrained basic service set (BSS) mode is supported and information related to use of the constrained BSS mode,
wherein the information related to the use of the constrained BSS mode includes first information related to which STA operates in the constrained BSS mode among STAs included in the transmitting MLD,
wherein the constrained BSS mode means a mode in which the STA operating in the constrained BSS mode performs monitoring for signal reception based on obtaining information to receive a signal from an STA not operating in the constrained BSS mode; and
transmitting an association response frame to the transmitting MLD.

* * * * *